United States Patent
Osada et al.

(10) Patent No.: US 9,495,622 B2
(45) Date of Patent: Nov. 15, 2016

(54) IMAGE FORMING SYSTEM FOR PREVENTING PAGING DISORDER

(71) Applicants: Hisashi Osada, Yamanashi-ken (JP); Kenichi Matsuno, Yamanashi-ken (JP); Takashi Saito, Yamanashi-ken (JP)

(72) Inventors: Hisashi Osada, Yamanashi-ken (JP); Kenichi Matsuno, Yamanashi-ken (JP); Takashi Saito, Yamanashi-ken (JP)

(73) Assignee: NISCA CORPORATION, Minamikoma-Gun, Yamanashi-Ken (JP)

(*) Notice: Subject to any disclaimer, the term of this patent is extended or adjusted under 35 U.S.C. 154(b) by 0 days.

(21) Appl. No.: 14/694,523

(22) Filed: Apr. 23, 2015

(65) Prior Publication Data
US 2015/0310316 A1 Oct. 29, 2015

(30) Foreign Application Priority Data
Apr. 24, 2014 (JP) ................................. 2014-089917

(51) Int. Cl.
| | |
|---|---|
| G06K 15/00 | (2006.01) |
| G06K 15/16 | (2006.01) |
| B65H 29/12 | (2006.01) |
| B65H 31/36 | (2006.01) |
| B65H 39/10 | (2006.01) |
| B65H 43/00 | (2006.01) |
| G03G 15/00 | (2006.01) |

(52) U.S. Cl.
CPC ............. *G06K 15/16* (2013.01); *B65H 29/125* (2013.01); *B65H 31/36* (2013.01); *B65H 39/10* (2013.01); *B65H 43/00* (2013.01); *G03G 15/6544* (2013.01); *G06K 15/403* (2013.01); *B65H 2301/4212* (2013.01); *B65H 2301/4213* (2013.01); *B65H 2301/42146* (2013.01); *B65H 2301/42194* (2013.01); *B65H 2301/431* (2013.01); *B65H 2301/44724* (2013.01); *B65H 2403/942* (2013.01); *B65H 2511/30* (2013.01); *B65H 2801/27* (2013.01); *B65H 2801/48* (2013.01); *G03G 2215/00793* (2013.01); *G03G 2215/00827* (2013.01); *G03G 2215/00877* (2013.01)

(58) Field of Classification Search
None
See application file for complete search history.

(56) References Cited

U.S. PATENT DOCUMENTS

| | | | | |
|---|---|---|---|---|
| 2008/0181701 A1* | 7/2008 | Fukasawa | .......... | G03G 15/6582 399/410 |
| 2011/0280643 A1* | 11/2011 | Matsumoto | .......... | G03G 15/234 400/582 |

FOREIGN PATENT DOCUMENTS

JP          5248785 B2     4/2013

* cited by examiner

*Primary Examiner* — Andrew H Lam
(74) *Attorney, Agent, or Firm* — Manabu Kanesaka

(57) ABSTRACT

Provided is an image forming system having a simple buffer mechanism and capable of preventing paging disorder when image-formed sheets are fed to a processing section. The present invention is featured in that an image forming order of a plurality of sheets to be made to stand by in a buffer section of a conveying path for guiding the sheets to a processing section is made different from an image forming order of sheets that are not made to stand by. To realize this, the system includes an image forming section, an accumulating section that accumulates image-formed sheet for processing, a conveying path along which the sheet is conveyed from the image forming section to the accumulating section, a buffer section disposed in the conveying path, in which the sheet to be fed to the accumulating section is made to temporarily stay, and a control section that controls the image forming section and the accumulating section.

10 Claims, 17 Drawing Sheets

$f1 < f2 < f3$

IMAGE FORMING SYSTEM FOR PREVENTING PAGING DISORDER

RELATED APPLICATIONS

The present application is based on, and claims priority from, Japanese Application No. JP2014-089917 filed Apr. 24, 2014, the disclosure of which is hereby incorporated by reference herein in its entirety.

BACKGROUND OF THE INVENTION

Field of the Invention

The present invention relates to an image forming system that forms an image on sheets, then accumulates the image-formed sheets into a set, and performs post-processing such as binding processing and/or folding processing and, more particularly, to improvement of a post-processing system capable of efficiently performing continuous processing.

Description of the Related Art

In general, a post-processing system of such a type uses an image forming device provided at an upstream side to form an image on sheets and then uses a post-processing device provided at a downstream side to accumulate the image-formed sheets into a set and to perform bookbinding and other post-processing. Such a system is required, in terms of system operating efficiency, to continuously form an image by means of the upstream side image forming device and to perform the post-processing at the downstream side in accordance with a processing speed of the image forming device.

Thus, as the post-processing device, a system is required, in which a sheet (succeeding sheet) fed from the upstream side image forming device in the middle of the post-processing is made to temporarily stay in a sheet conveying path and fed after completion of the current post-processing in a time as short as possible to a post-processing section.

For example, Japanese Patent Publication No. 5,248,785 (Patent Document 1) discloses a post-processing device provided with a straight path that guides a sheet fed from an image forming device to a first processing section and a branch path that is branched from the straight path and guides the sheet to a second processing section. This publication proposes a path configuration where a succeeding sheet fed from an upstream side while the first processing section performs a processing job is made to stay in the branch path for guiding a sheet to the second processing section and a succeeding sheet fed from the upstream side while the second processing section performs a processing job is made to stay in the straight path.

An image forming device provided upstream of the above post-processing device is configured to form an image on a sheet at a predetermined timing irrespective of the downstream side post-processing operation and discharges the image-formed sheet from a sheet discharge port. The post-processing device receives the discharged sheet and makes the received sheet stay in the branch path for guiding a sheet to the second processing section when a post-processing mode specifies the first processing section, while makes the received sheet stay in the straight path for guiding a sheet to the first processing section when the post-processing mode specifies the second processing section. Then, after completion of a current job in the first or second processing section, the staying sheet is fed to the first or second processing for subsequent processing.

PATENT DOCUMENT

[Patent Document 1] Japanese Patent Publication No. 5,248,785

As described above, there is known a system that includes, downstream of an image forming device, a post-processing device that accumulates sheets and performs the post-processing for the accumulated sheets, the system being configured to continuously execute image formation on the sheets and post-processing such as binding processing and/or folding processing after accumulating and aligning the image-formed sheets.

In such a device, while a post-processing section executes the post-processing, a succeeding sheet is subjected to image formation in an upstream side image forming section and fed to the post-processing section. To realize this, the device employs a conveying system where the succeeding sheet is made to temporarily stay in a path provided at an upstream side of the post-processing section and fed to the post-processing section after completion of the post-processing operation.

In such a buffer section formed in the sheet conveying path, one succeeding sheet or a plurality of succeeding sheets can stay in a standby state. When one standby sheet is fed to the post-processing section, paging disorder does not occur; on the other hand, when a plurality of sheets made to stay in an overlapping state are fed to the post-processing section, the paging disorder may occur.

Such paging disorder occurs when the sheets to be fed to the buffer section are overlapped in a reverse order, when the plurality of overlapped sheets are collectively fed to the post-processing section, or the like. The former case is caused due to an error in the sheet conveying operation and can be solved by improvement of a conveying mechanism.

With regard to the paging disorder of the latter case which is caused due to collective feeding of the plurality of sheets, there can be considered a sheet conveying mechanism that prevents the paging disorder by setting an overlapping order of the plurality of sheets in the buffer section such, that, for example, a third page is inserted under a first page; however, such a mechanism is complicated and is thus likely to cause an error. For example, sheets fed from a carry-in port in the order of page 1, page 2, and page 3, and pages 4, 5, and 6 are made to stay in the buffer section in this order. In this case, when the staying sheets are bundle-conveyed to the post-processing section, the paging disorder (page order is 1, 2, 3, 6, 5, 4) occurs in a conventional path configuration.

Conventionally, to solve such a problem, the sheets to be made to stay in the buffer section are overlapped such that a succeeding sheet is inserted under a preceding sheet. Thus, sheet jamming frequently occurs in the buffer section.

Further, in the configuration where the sheets are fed from one buffer section to a plurality of different post-processing sections, an overlapping order of the sheets in the buffer section is preferably varied depending on the conveyance-target post-processing section. This, however, requires a complicated mechanism and complicated control. Thus, conventionally, a plurality of buffer sections are provided. That is, a buffer section for the first processing section and a buffer section for the second processing section are disposed at different positions in the conveying path.

An object of the present invention is to provide an image forming system having a simple buffer mechanism and capable of preventing paging disorder when the image-formed sheets are fed to the post-processing section.

SUMMARY OF THE INVENTION

To solve the above problem, the present invention is featured in that an image forming order of a plurality of sheets to be made to stand by in a buffer section of a conveying path for guiding the sheets to a post-processing section is made different from an image forming order of sheets that are not made to stand by.

An image forming system according to the present invention includes an image forming section, an accumulating section that accumulates image-formed sheet for post-processing, a conveying path along which the sheet is conveyed from the image forming section to the accumulating section, a buffer section disposed in the conveying path, in which the sheet to be fed to the accumulating section is made to temporarily stay, and a control section that controls the image forming section and the accumulating section.

The control section includes a calculating unit that calculates the number of sheets to be made to stand by in the buffer section of the conveying path and an image order setting unit that sets an image forming order of sheets to be made to standby based on the number of sheets calculated by the calculating unit.

The present invention is configured such that the number of sheets to be made to stand by in the buffer section for guiding the sheets to the post-processing section is determined before image formation so as to make the image forming order of the sheets to be made to stand by different from the image forming order of sheets that are not made to stand by and thereby provides the following advantages.

The buffer section is disposed upstream of the post-processing section, and a plurality of sheets are made to stand by in an overlapped state in the buffer section. At this time, the sheets in the buffer section are overlapped in such an order that allows prevention of sheet jamming and overlapping at an accurate position. Forming an image in a page order corresponding to the overlapping order prevents paging disorder.

Further, in a configuration in which the standby sheets are fed to a plurality of different post-processing sections from the buffer section in the conveying path, the image forming page order of a plurality of sheets to be made to stay in the buffer section can be changed according to a stacking condition of the destination post-processing section. Thus, a plurality of buffer sections need to be provided for respective processing sections in a conventional configuration, whereas in the present invention, it is possible to feed the standby sheets from a single buffer section to the plurality of post-processing sections.

BRIEF DESCRIPTION OF THE DRAWINGS

FIGS. 7A and 7B are explanatory views each illustrating an operation state where buffer sheets are conveyed to a first post-processing section, in which FIG. 7A illustrates a state where the sheets are made to stand by in the buffer section and FIG. 73 illustrates a state where the buffer sheets are conveyed from the buffer section to first post-processing section;

FIGS. 8A and 8B are explanatory views each illustrating an operation state where the buffer sheets are conveyed to the first post-processing section, in which FIG. 8A illustrates a state where the buffer sheets are positioned to a processing position on a processing tray and FIG. 8B illustrates a state where the buffer sheets are made to abut against a regulating stopper;

FIGS. 9A and 9B are explanatory views each illustrating an operation state where the buffer sheets are conveyed to a second post-processing section, in which FIG. 9A illustrates a state where the sheets are made to stand by in the buffer section and FIG. 9B illustrates a state where the buffer sheets start being conveyed from the buffer section to second post-processing section;

DESCRIPTION OF THE PREFERRED EMBODIMENTS

Figure 1:
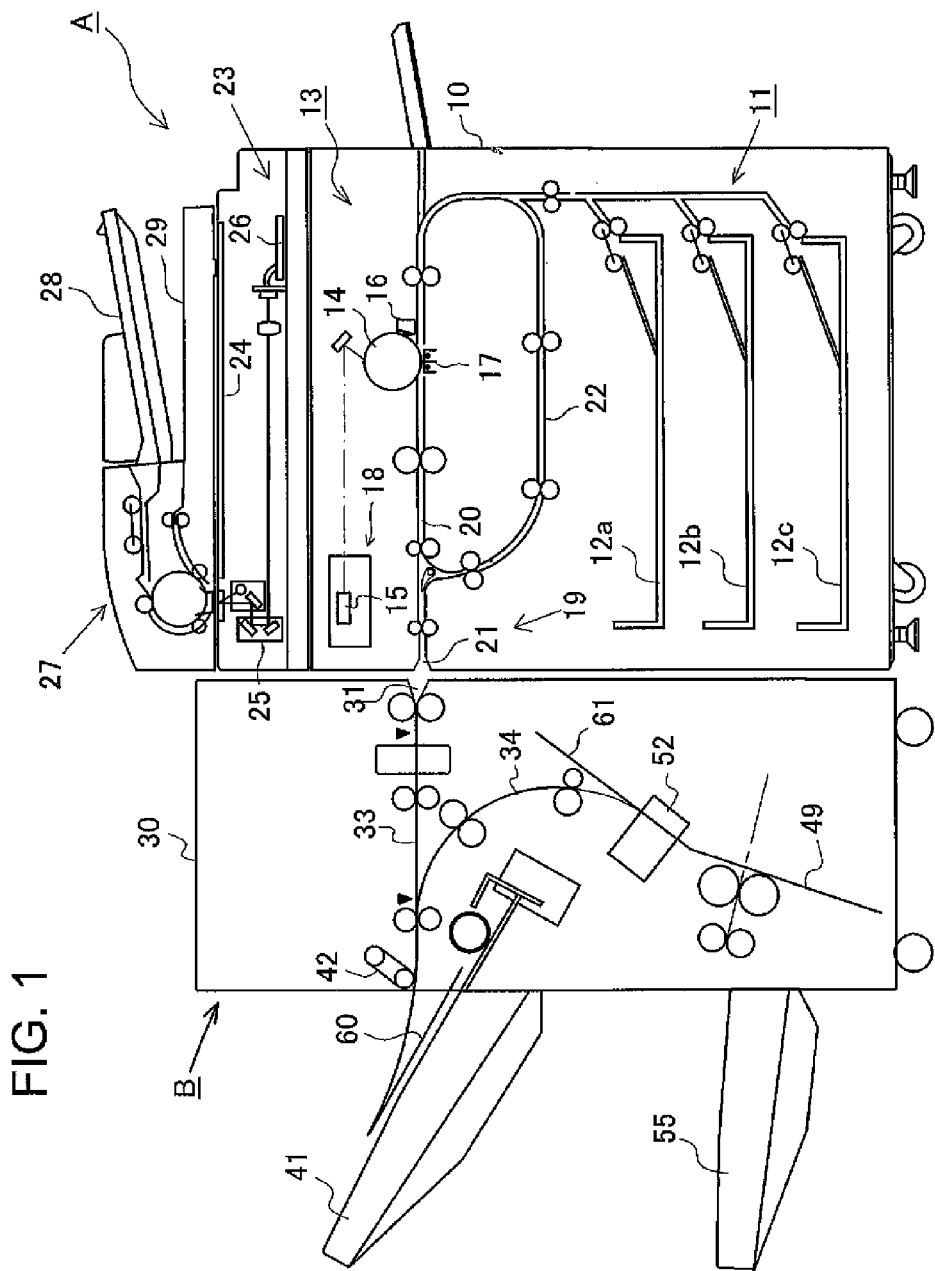
FIG. 1 is an explanatory view of an entire configuration of an image forming system according to the present invention.

Hereinafter, the present invention will be described in detail based on illustrated preferred embodiments. The present invention is featured in that when a plurality of sheets (succeeding sheets) on which an image has been formed by an image forming device A are made to temporarily stand by during execution of post-processing in a post-processing device B, an image forming order (page order) of the sheets made to stand by is made different from that of the sheets that are not made to stand by.

To realize the above feature, the present invention can take the following embodiments: an embodiment (first embodiment to be described later) in which the image forming device A is provided with "image order setting unit that calculates the number of standby sheets and sets an image forming order for standby sheets"; an embodiment (second embodiment to be described later) in which the post-processing device B is provided with "controller that calculates the number of standby sheets and feeds sheets on which an image has been formed based on a result of the calculation to a post-processing section after making the image-formed sheets temporarily stand by"; and an embodiment (third embodiment to be described later) in which an image forming system is provided with "unit that calculates the number of sheets and sets an image forming order based on a result of the calculation". First, the image forming device A and post-processing device B which are common in first to third embodiments to be described later will be described.

Image Forming Device

The image forming device A is disposed upstream of the post-processing device B and is configured to form an image on a sheet and feeds the image-formed sheet to the downstream side post-processing device B through a sheet discharge port 21. The illustrated image forming device A includes, in a device housing 10, a sheet supply section 11, an image forming section 13, a sheet discharge section 19, and a data processing section 18.

The sheet supply section 11 stores sheets to be image-formed in sheet supply stackers (sheet cassettes) 12a, 12b, and 12c and delivers the sheets of a size specified by a mode setting unit one by one to the downstream side image forming section.

The image forming section 13 forms an image based on specified image data onto the specified size sheet fed from the sheet supply section 11. As an image forming mechanism of the image forming section 13, various types of image forming mechanisms, such as an electrostatic print mechanism as illustrated, an inkjet print mechanism, a transfer ribbon print mechanism, a thermal print mechanism, and an offset print mechanism can be adopted.

Operation in the image forming section 13 having the illustrated electrostatic print mechanism is as follows. That is, a latent image is formed on a photosensitive drum 14 by means of a print head (light beam generator) 15, and toner is adhered to the latent image by means of a developing unit 16 to thereby form a toner image on a surface of the drum. The toner image is then transferred, by means of a charger 17, onto a sheet fed from the sheet supply section 11.

In the sheet discharge section 19, the sheet fed from the charger 17 is heated to fix the image thereonto. The resultant sheet is conveyed along a sheet discharge path 20 to the sheet discharge port 21. The sheet discharge port 21 is connected with a duplex path 22, along which the sheet that has once been carried out from the sheet discharge port 21 is fed back (switchback-conveyed) to the image forming section 13 with a conveying direction thereof reversed. During the conveyance along the duplex path 22, front and back surfaces of the sheet are reversed. Then, an image is formed on the back surface of the sheet on the front surface of which an image has been formed, and the resultant sheet is carried out through the sheet discharge port 21.

A reference numeral 23 in FIG. 1 denotes a scanner unit. The scanner unit 23 includes a platen 24 on which a document is placed, a reading carriage 25 that scans the document on the platen to read an image on the document, and an image processing section 26 that transfers image data corresponding to the read image to the data processing section 18 of the image forming device A.

A reference numeral 27 in FIG. 1 denotes a feeder unit. The feeder unit 27 feeds sheets set on a sheet supply stacker 28 to the platen 24 one by one while separating them from each other to house the read document sheet in a sheet discharge stacker 29.

The data processing section 18 includes an interface section (input/output unit) serving as an interface with an external device, an image forming data (hereinafter, referred to as "image data") storage section (storage unit), and a transfer data storage unit (buffer memory). The data processing section 18 stores image data sent from an external device (scanner, external computer, external network, or communication network) in the storage section and feeds this data to a head control section through the buffer memory.

Although different depending on a type of the image forming mechanism, generally the head control section controls a head element (laser head, thermal head, inkjet head, or the like) based on image data to be printed (in terms of an amount of light, amount of heat, or amount of ink).

With such a configuration, image data sent from a scanner or an external device are stored in the storage section for each document in a page-manageable manner. From the storage section, image data to be printed is transferred to a head control memory through the buffer memory (transfer data storage unit). In the head control memory, the image data are stored in a line order, a block order, or a page order and developed so as to be able to physically control the head element. Accordingly, the head element forms an image on a sheet based on image data managed in page units.

Configuration of Post-Processing Device

The post-processing device B connected to the above-described image forming device A performs predetermined post-processing for the image-formed sheet. The post-processing includes file hole punching (punch mechanism), document binding (staple mechanism), document folding (folding roll mechanism), stamping (stamp mechanism), and a combination thereof. In the following description, bookbinding where image-formed sheets are accumulated in an aligned state and subjected to binding will be described. However, the post-processing device B can perform various processing other than the bookbinding.

Figure 2:
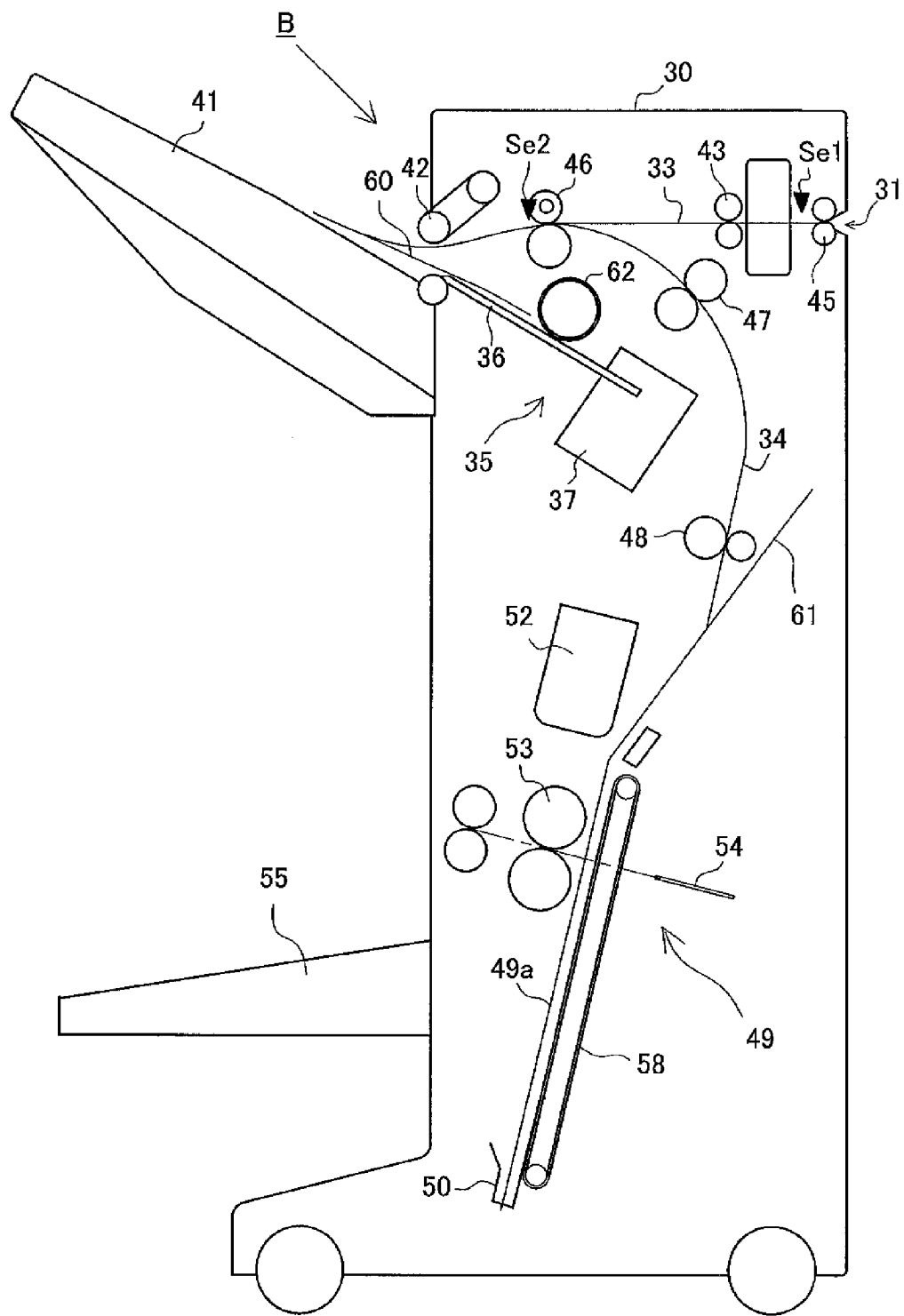
FIG. 2 is an explanatory view of a configuration of a post-processing device in the system illustrated in FIG. 1.

The post-processing device B illustrated in FIG. 2 is connected to the image forming device A and can execute a "first post-processing mode" that accumulates image-formed sheets into a set (group) and performs binding (end binding) and a "second post-processing mode" that accumulates the image-formed sheets in a bundle, performs binding, and then folding. In this specification, cases (first and second embodiments to be described later) where the present invention is applied to the second post-processing mode will be described. The device illustrated in FIG. 2 can further execute a "third post-processing mode (printout mode)" that houses image-formed sheets in a downstream side housing section.

As illustrated in FIG. 2, the post-processing device B includes, in a casing 30, a first post-processing section for executing the first post-processing mode and a second post-processing section 49 for executing the second post-processing mode. A sheet conveyed along a conveying path 32 having a carry-in port 31 connected to the main body sheet discharge port 21 is distributed to one of the first post-processing section 35 and the second post-processing section 49.

Configuration of Conveying Path

The conveying path 32 includes a straight path 33 and a branch path 34. The branch path 34 is branched from the straight path 33 at a path branch portion 32a (hereinafter, referred to as "branch portion"), and the sheet carried in from the carry-in port 31 is delivered in one of a straight path direction and a branch path direction. To realize this, a path switching unit 44 is disposed at the branch portion 32a. The path switching unit 44 guides a sheet to sheet discharge ports of the respective paths based on a signal from a controller 76 to be described later.

The illustrated straight path 33 is constituted by a substantially straight path. The straight path 33 has the carry-in port 31 at one side surface (right side wall) of the casing 30 and a path sheet discharge port 33a at the other side surface (left side wall) of the casing 30. That is, as illustrated in FIG. 2, the straight path 33 is formed so as to horizontally cross the casing 30 in a substantially straight line (or in a curved line), and the first post-processing section 35 is disposed downstream of the path sheet discharge port 33a (hereinafter, referred to as "first sheet discharge port").

The branch path 34 extends in a direction crossing the straight path 33. That is, in the casing 30, the straight path 33 extends substantially horizontally in the casing 30, while the branch path 34 extends substantially vertically. As illustrated in FIG. 2, the branch path 34 is branched from the horizontally-extending straight path 33 so as to guide a sheet in the vertical direction toward the second post-processing section 49 from a path sheet discharge port 34a (hereinafter, referred to as "second sheet discharge port").

The path switching unit 44 is disposed at the branch portion 32a. The path switching unit 44 guides a sheet fed from the carry-in port 31 to the sheet discharge port (first sheet discharge port) 33a of the straight path 33 or sheet discharge port (second sheet discharge port) 34a of the branch path 34. To realize this, the path switching unit 44 includes a movable guide member (flapper member) and a not illustrated shift unit (operating solenoid, motor, etc.) that shifts an angular position of the movable guide member.

Conveying units for conveying a sheet are disposed in the straight path 33 and branch path 34. In the example illustrated in FIG. 3, a carry-in roller 45 and a sheet discharge roller 46 (first sheet discharge roller) are arranged in a sheet discharge direction in the straight path 33. Specifically, the carry-in roller 45 is disposed at the carry-in port 31, the sheet discharge roller 46 is disposed at the sheet discharge port 33a, and a conveying roller (intermediate roller) 43 is disposed between the rollers 45 and 46. On the other hand, in the branch path 34, a sheet discharge roller 47 (second sheet discharge roller) and a third sheet discharge roller are arranged. Specifically, the sheet discharge roller 47 is disposed at the branch path port (branch portion) 32a, and the third sheet discharge roller is disposed downstream of the roller 47.

The above-described rollers 45, 46, 47, and 48 (carry-in roller and first, second, third sheet discharge rollers) receive, from a not illustrated drive motor, conveying force for conveying a sheet in the conveying direction. Specifically, the carry-in roller 45 and intermediate roller 43 receive conveying force for conveying a sheet in the sheet discharge direction. The first sheet discharge roller 46 receives conveying force (normal rotation) for carrying out a sheet toward the first sheet discharge port and conveying force (reverse rotation) for conveying a sheet toward the branch path.

The second sheet discharge roller 47 receives conveying force for conveying a sheet in both normal/reverse rotation directions of the drive motor. The third sheet discharge roller 48 receives conveying force for carrying out a sheet from the second sheet discharge port 34a. In the illustrated device, the conveying force is transmitted from a single drive motor to the carry-in roller 45 and first to third sheet discharge rollers 46 to 48 through a clutch mechanism.

A switchback path 60 (hereinafter, referred to as "first switchback path") is formed between the first sheet discharge port 33a and first post-processing section 35. The first switchback path 60 moves backward a sheet carried out by means of the first sheet discharge roller 46 and whose conveying direction is reversed to a predetermined post-processing position. On the other hand, a switchback path 61 (hereinafter, referred to as "second switchback path") is formed in the branch path 34. The second switchback path 61 guides a sheet whose conveying direction is reversed when a rear end of the sheet passes through the branch portion 32a to the second sheet discharge port 34a. The switchback paths 60 and 61 are each constituted by a path (straight path 33, branch path 34) for guiding a sheet and normal/reverse rotation control of the conveying roller (first sheet discharge roller 46, second sheet discharge roller 47).

Thus, a sheet carried in from the carry-in port 31 and conveyed along the straight path 33 enters the first post-processing section 35 (processing tray 36 to be described later) in a direction opposite to a direction in which the sheet is carried in, i.e., from the rear end thereof. Further, a sheet conveyed along the branch path 34 enters the second post-processing section 49 (accumulation guide 49a to be described later) in the direction opposite to the carry-in direction, i.e., from the rear end thereof. The first switchback path 60 and the second switchback path 61 are disposed spaced apart from each other at respective downstream and upstream sides in the sheet discharge direction of the straight path 33 (see FIG. 2).

Sheet sensors Se1 and Se2 are disposed in the straight path 33. The sheet sensor Se1 detects a sheet passing through the carry-in port 31. The sheet sensor Se2 detects a sheet passing through the first sheet discharge port 33a. Detection signals of the respective sensors Se1 and Se2 are used as a reference signal for sheet conveying control, such as control of a guide direction of the path switching unit 44, control of start/stop of the conveying roller, and determination control of sheet jamming.

In the illustrated device, the first sheet discharge roller 46 and the second sheet discharge roller 47 disposed opposite to each other with respect to the branch portion 32a are each composed of a pair of rollers that put a sheet therebetween into a pressurization state where the sheet is pressurized at a predetermined pressure when contacting each other and put the sheet into a pressurization release state when separating from each other or while keeping the contacting state. Although a configuration of the roller pair is not illustrated especially, one of the pair of rollers that are brought into press-contact with each other is axially supported so as to be movable in the press-contact direction.

The pair of rollers pressurize each other in the press-contact direction by means of a biasing spring, and the pressurizing force is released or reduced by means of a release lever connected to an actuator such as an operating solenoid. The roller pair is thus put into the pressurization state to pressurize each other when the sheet is conveyed by this roller pair or into the pressurization release state to reduce the pressurizing force therebetween when the sheet is conveyed by a different adjacent roller pair so as not to impede the sheet conveyance.

The roller pair is shifted between the pressurization state and pressurization release state by the release lever and an actuator such as an operating solenoid. That is, the roller pair is rotated in a press-contact state when a plurality of sheets are conveyed in an overlapped state in a predetermined direction, while the roller pair is separated from the sheet (or press-contact force between the roller pairs is reduced) when the sheet is conveyed by a different adjacent roller pair so as not to impede the sheet conveyance.

First Post-Processing Section

The first post-processing section 35 disposed downstream of the first sheet discharge port 33a will be described using FIG. 3. A processing tray 36 having a sheet placement surface 36a on which a sheet is placed is disposed downstream of the first sheet discharge port 33a so as to form a step from the straight path 33. A conveying rotating body 62 (paddle rotating body, belt rotating body, etc.) that conveys a sheet toward a predetermined post-processing position is disposed above the processing tray 36.

The sheet placement surface 36a has a sheet end regulating unit 38 that stops a sheet at a predetermined position (post-processing position), an aligning unit 39 that positions a width direction of sheets stacked on the sheet placement surface to a reference position, and a post-processing unit (stapler) 37 that performs binding for sheets.

Figure 3:
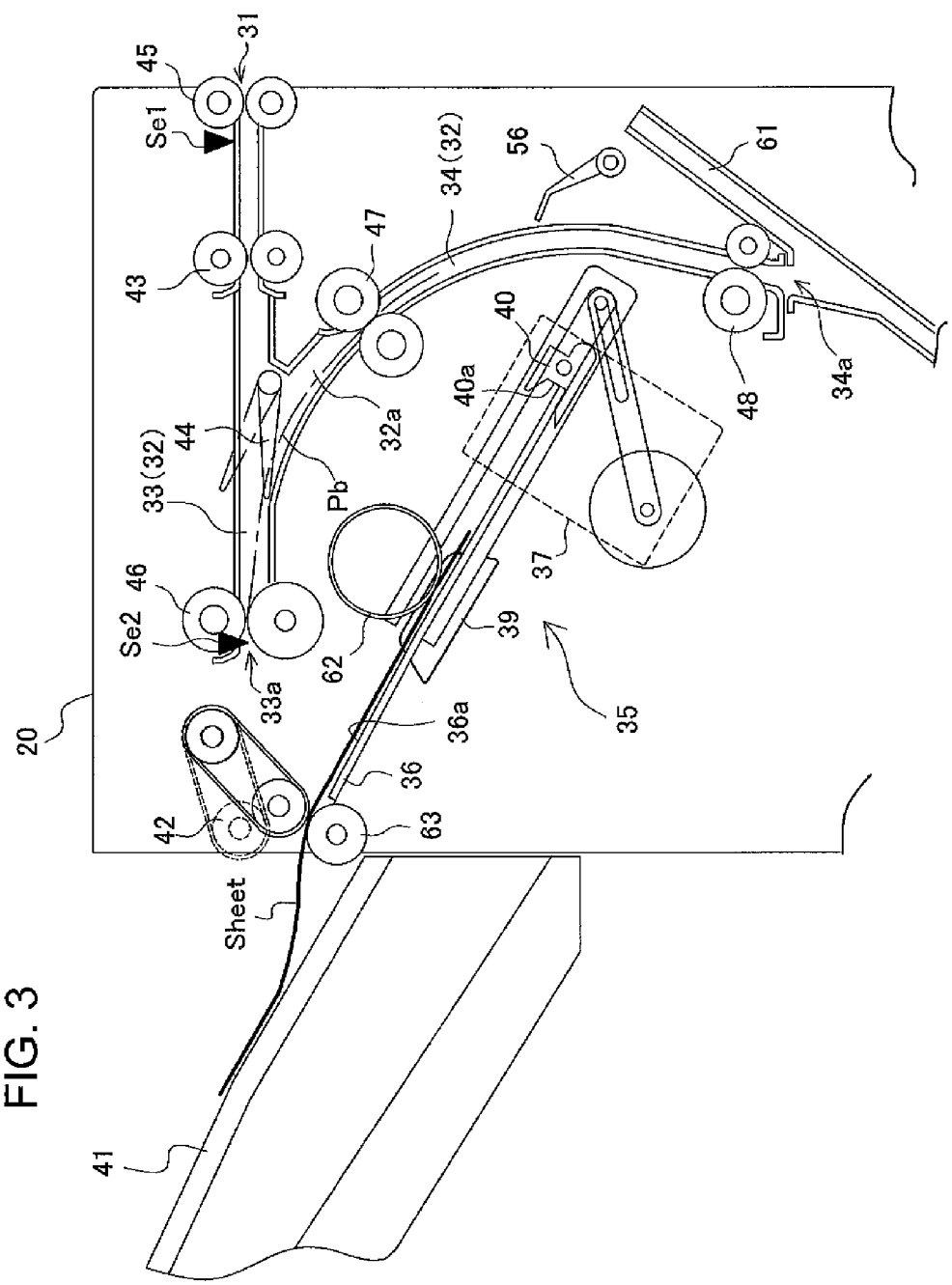
FIG. 3 is an explanatory view of a configuration of a first post-processing section in the post-processing device of FIG. 2.

As illustrated in FIG. 3, the processing tray 36 has a sheet carry-in unit 42 that guides a sheet from the first sheet discharge port 33a to the sheet placement surface 36a and a sheet carry-out unit 40 that carries out a sheet (bundle) that has been subjected to the post-processing from the sheet placement surface to a first housing stacker 41 on downstream.

The sheet carry-in unit 42 is disposed between the first sheet discharge port 33a and the processing tray 36 and configured to reverse the conveying direction of the sheet (to switchback the sheet) carried out from the sheet discharge port and feed the sheet toward the sheet placement surface 36a. The sheet carry-in unit 42 is constituted by a lifting roller, a paddle rotating body, a belt rotating body, or the like. In the illustrated example, the sheet carry-in unit 42 is constituted by a lifting roller configured to be vertically movable between an operating position at which it is engaged with a sheet carried out from the first sheet discharge port 33a and a standby position retreated from the operating position. The sheet carry-in unit 42, i.e., the lifting roller is connected to a not-illustrated lifting motor and a not-illustrated normally and reversely rotatable motor such that it is rotated in a normal direction until a sheet rear end passes through the first sheet discharge port 33a and thereafter rotated in a reverse direction.

The sheet carry-out unit 40 is constituted by a conveyor mechanism that is reciprocated along the sheet placement surface 36a between a processing position and the downstream side housing stacker 41. The conveyor mechanism includes an engagement member 40a engaged with an end edge of a sheet bundle on the sheet placement surface and a belt (not illustrated) that reciprocally moves the engagement member along the sheet placement surface. Further, the sheet placement surface 36a has a roller (fixed roller) 63 opposite to the sheet carry-in unit 42 (lifting roller). Sheets are conveyed in the sheet discharge direction by the roller 63 and lifting roller 42 while being nipped between the rollers 63 and 42.

Second Post-Processing Section

Figure 4:
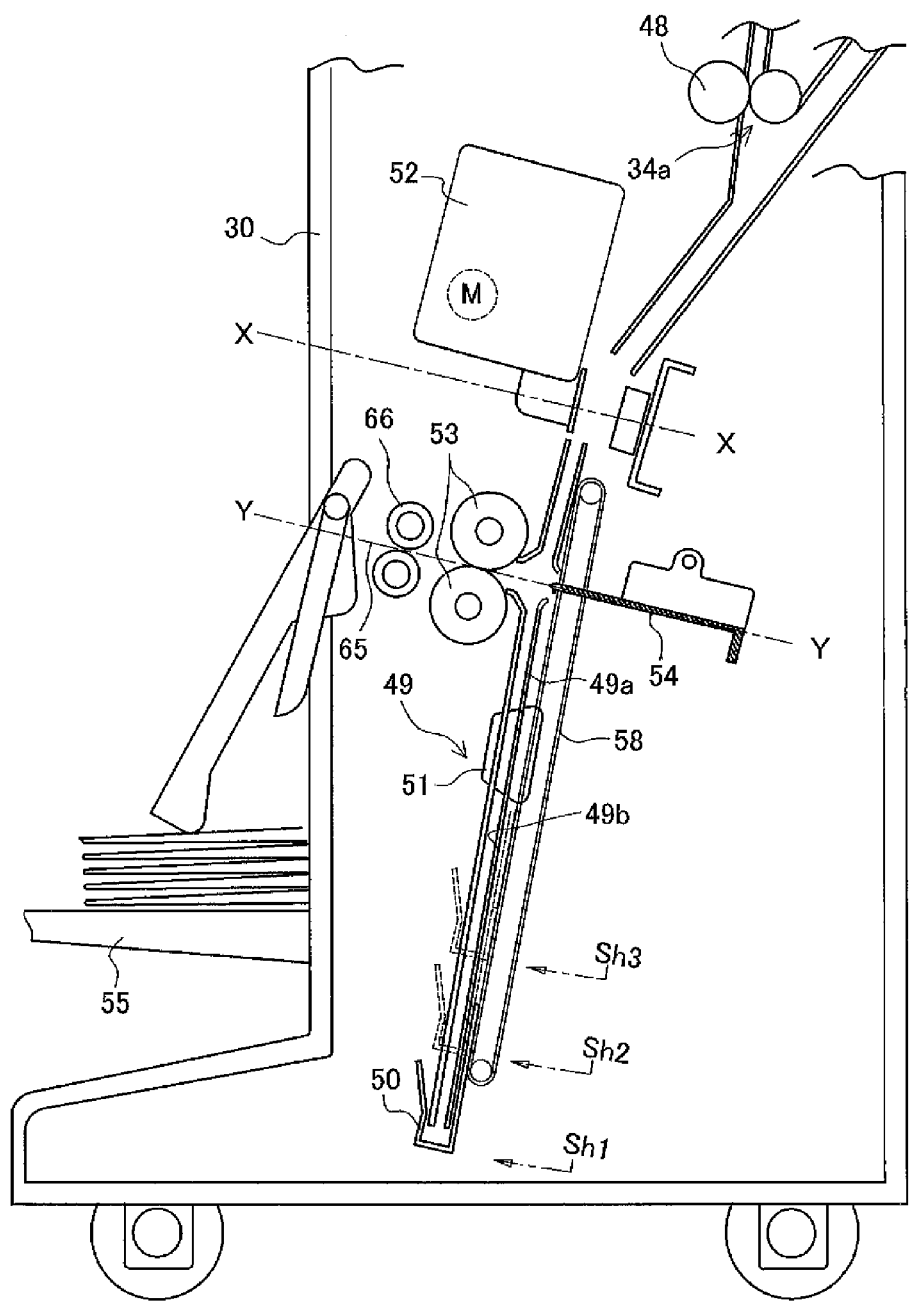
FIG. 4 is an explanatory view of a configuration of a second post-processing section in the post-processing device of FIG. 2.

The second post-processing section 49 disposed downstream of the second sheet discharge port 34a will be described using FIG. 4. There are disposed, in the second post-processing section 49, an accumulation guide 49a that accumulates and aligns sheets fed from the branch path 34, a binding unit 52 that binds a bundle of the accumulated sheets, and folding units 53 and 54 that center-fold a sheet bundle.

The accumulation guide 49a is constituted by a guide member having a stacking surface 49b on which sheets fed from the second sheet discharge port 34a are stacked in a vertically standing state (standing posture). The accumulation guide 49a has a leading end regulating unit 50. The leading end regulating unit 50 is disposed so as to be movable along the accumulation surface and configured to stop an end portion (leading end portion) of a sheet for position regulation. The accumulation guide 49a further has an aligning unit 51 that positions a width direction of stacked sheets to a reference position.

The binding unit 52 is constituted by a saddle stitching staple unit that saddle-stitches a sheet bundle on the stacking surface 49b. A configuration of this staple unit is widely known, so description thereof will be omitted. The folding unit is constituted by a folding roll and a folding blade 54. The folding roll 53 is constituted by a pair of rolls that are brought into press-contact and is connected to a drive motor (not illustrated) that is rotated in a clockwise direction (folded sheet discharge direction) in FIG. 4.

The folding blade 54 is constituted by a plate-like member that pushes a folding position of a sheet bundle into between the rolls and is connected to a shift motor (not illustrated) so as to be reciprocally moved between a standby position separated from the roll pair and an operating position between the rolls. The aligning unit 51 is constituted by a pair of left and right aligning plates that can move a sheet supported on the stacking surface in the width direction and has a not illustrated aligning motor.

A sheet discharge path 65 and a sheet discharge roller (fourth sheet discharge roller) that carry out a sheet bundle that has been subjected to folding are disposed downstream of the folding roll 53, and a second housing stacker 55 is disposed downstream of the sheet discharge path 65 and the sheet discharge roller 66. The sheet discharge path 65 extends in a direction substantially perpendicular to the stacking surface 49b of the second post-processing section 49 and carries out the sheet bundle in the same direction as that in which the straight path 33 carries out the sheet. The second housing stacker 55 is disposed below the first housing stacker 41.

Buffer Section

A sheet carried in from the carry-in port 31 and conveyed along the straight path 33 is guided to the first post-processing section 35 through the first sheet discharge port 33a or guided to the second post-processing section 49 through the branch path 34. A bundle of sheets accumulated into a set (group) in the first post-processing section 35 is subjected to the binding and then housed in the first housing stacker 41 (first post-processing mode). On the other hand, a bundle of sheets accumulated into a set in the second post-processing section 49 is subjected to the binding and the folding and then housed in the second housing stacker 55 (second post-processing mode).

Thus, sheet conveying control is required, in which a sheet carried in from the carry-in port 31 is made to stand by (made to stay) in the middle of the sheet conveying path until completion of post-processing operation of the first post-processing section 35 or the second post-processing section 49. This control is required for the upstream side image forming device A to perform (during execution of post-processing operation) a print process of forming an image on a sheet without interruption.

To this end, a path buffer section Pb (hereinafter, referred to as "buffer section") is provided in the conveying path (straight path 33 and branch path 34), and a sheet fed from the upstream side during execution of the post-processing operation is made to temporarily stand by in the buffer section Pb. One or a plurality of sheets can be made to stand by depending on the length of time of the post-processing.

As a process speed in the upstream side image forming device A becomes high, the number of sheets to be made to stand by in the buffer section Pb of the post-processing device B becomes large.

The present invention enables a plurality of sheets made to stand by in the conveying path to be conveyed to the post-processing section collectively in an overlapped state. That is, when the plurality of sheets made to stand by in the conveying path are delivered to the downstream side post-processing according to the standby order, paging disorder does not occur. However, when the plurality of sheets are conveyed to the post-processing section collectively, paging disorder may occur between the sheets made to stand by and those not made to stand by.

Figure 5:
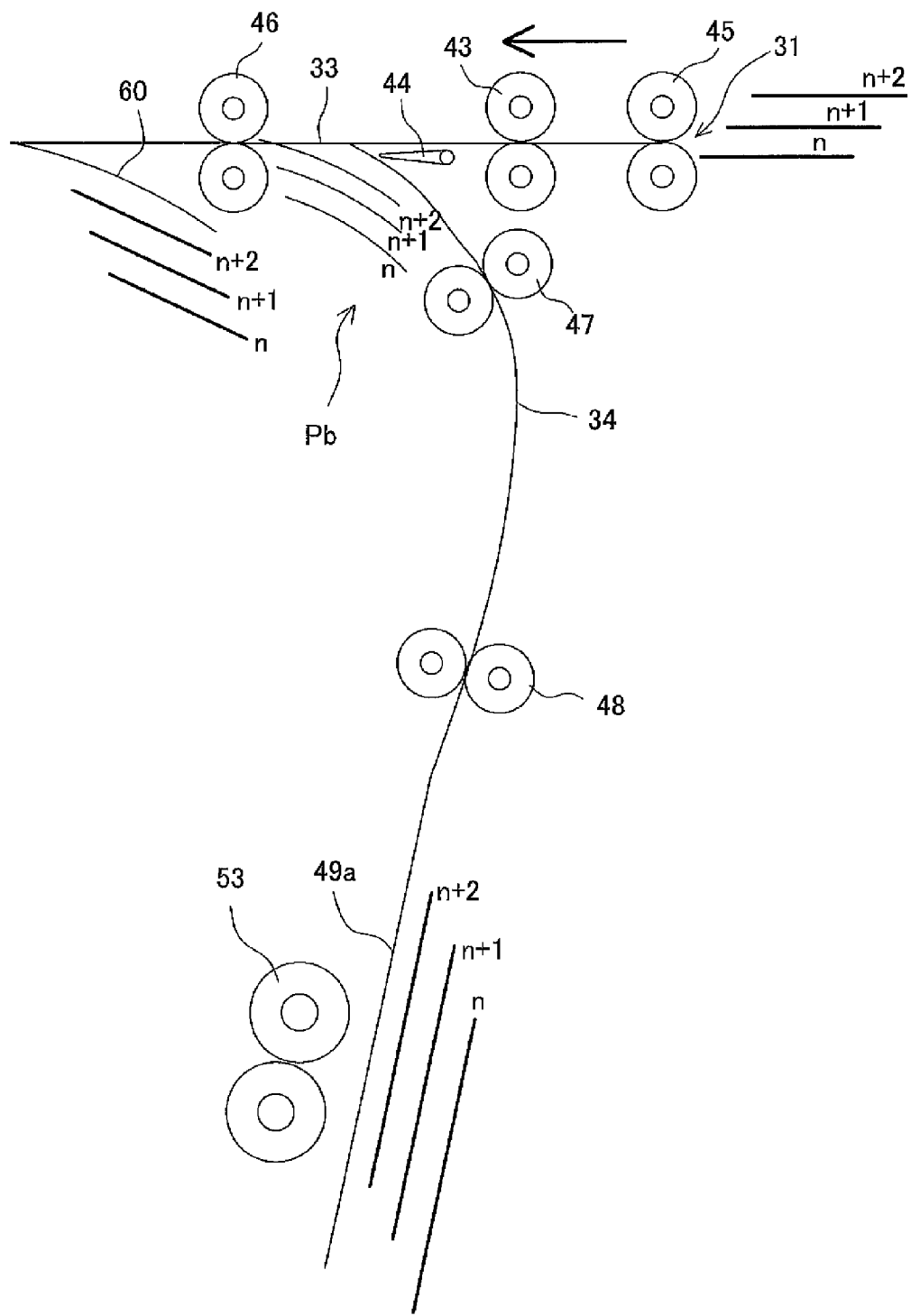
FIG. 5 is an explanatory view of a sheet conveying state in the post-processing device of FIG. 2.
Figure 6:
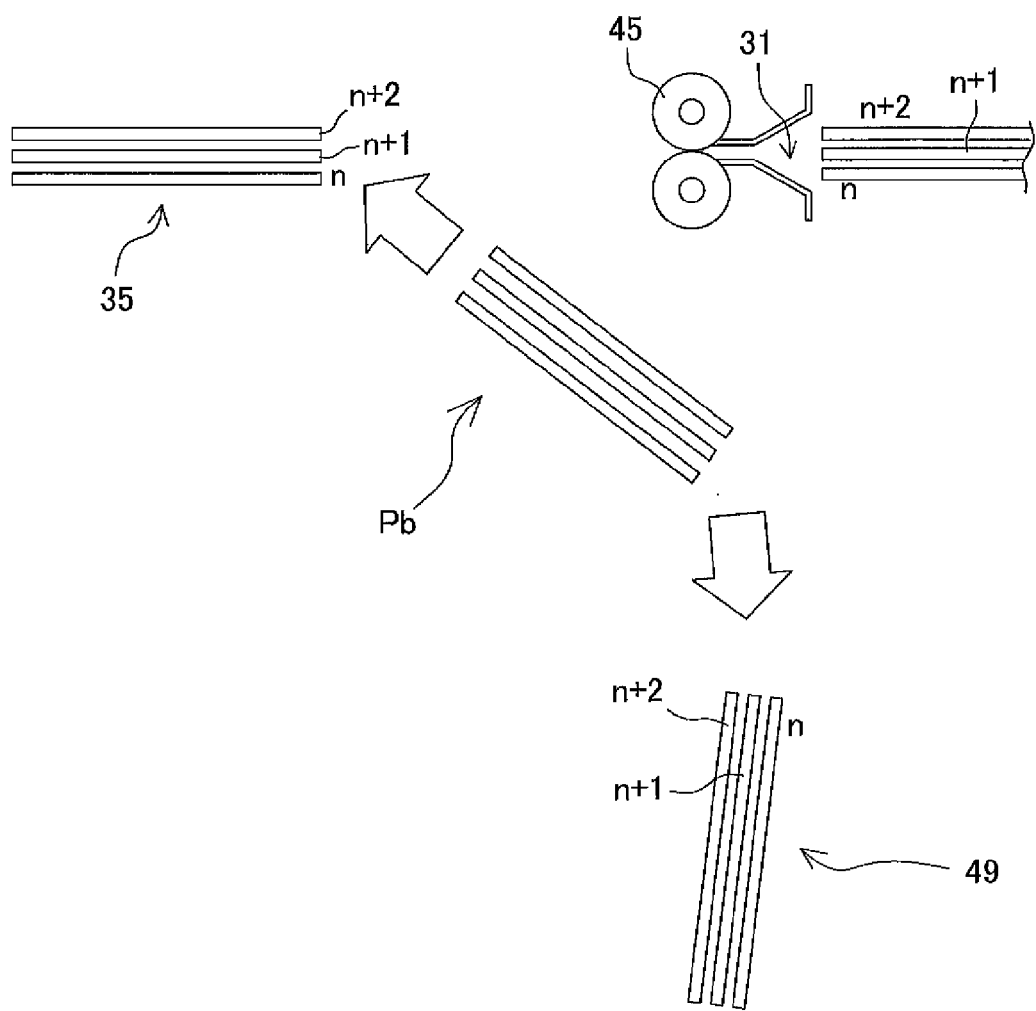
FIG. 6 is an explanatory view of a state where sheets made to stay in a path buffer section are conveyed to the post-processing section.

FIG. 5 illustrates a flow of sheets guided to the second post-processing section 49. As illustrated, a first sheet (n) carried in from the carry-in port 31 is stacked on the stacking surface of the accumulation guide 49a, a second sheet (n+1) is stacked on the first sheet (n), and a third sheet (n+2) is stacked on the second sheet (n+1). While the post-processing operation is executed in the second post-processing section 49, succeeding sheets are conveyed to the buffer section and stacked in the conveying order (n, n+1, n+2) for standby. When the plurality of stacked standby sheets are conveyed to the accumulation section collectively, page disorder occurs.

A configuration of the buffer section Pb in the illustrated device will be described. As illustrated in FIG. 3, the buffer section Pb is disposed astride over the straight path 33 positioned downstream of the branch portion 32a and the branch path 34. Specifically, the buffer section Pb is disposed between the first sheet discharge roller 46 (first conveying roller) of the straight path 33 and the second sheet discharge roller 47 (second conveying roller) of the branch path 34, and a sheet is bridged between both the rollers 46 and 47 (bridge support structure). That is, a distance between the first sheet discharge roller 46 and the second sheet discharge roller 47 is set to a value smaller than a conveying direction length of a minimum-sized sheet to be post-processed.

The first and second sheet discharge rollers 46 and 47 are connected to a drive motor (not illustrated) so as to be normally/reversely rotatable. A controller 76 to be described later reverses a rotation direction of the first sheet discharge roller 46 from the normal rotation to reverse rotation to thereby guide a sheet on the straight path 33 to the branch path 34 and then fed to the buffer section Pb. At subsequent sheet supply timing, when the first and second sheet discharge rollers 46 and 47 are rotated in a clockwise direction (normal direction), the sheet standing by in the buffer section Pb to the first post-processing section 35; while when the first and second sheet discharge rollers 46 and 47 are rotated in a counterclockwise direction (reverse direction), the sheet standing by in the buffer section Pb to the second post-processing section 49.

In the present invention, the first and second conveying rollers for making a sheet temporarily stand by are constituted by the "roller pair 46 disposed at the sheet discharge port (first sheet discharge port) of the straight path 33" and "roller pair 47 disposed at an entrance of the branch path 34"; however, positions of the first and second conveying rollers are not limited to these positions, but the first and second conveying rollers may be located at any positions in the respective paths as long as they are front and rear roller pairs disposed at an interval smaller than the conveying direction length of the sheet. Further, although the first and second conveying rollers are each preferably a normally reversely rotatable roller pair, a plurality of roller pairs that can convey the sheet in both sheet discharge direction and counter-sheet discharge direction may be provided as rollers for making a sheet temporarily stand by.

The following describes control of the conveying rollers (sheet discharge rollers) when a sheet is made to stand by in the buffer section Pb. The conveying roller 45 and first sheet discharge roller 46 (first conveying roller) are rotated in the sheet discharge direction (normal direction; clockwise direction in FIG. 3) to convey a sheet fed to the carry-in port 31 along the straight path 33. Then, upon passage of a rear end of the sheet through the branch portion 32a, the first sheet discharge roller 46 is rotated in the counter-sheet discharge direction (reverse direction; counterclockwise direction in FIG. 3). At the same time, the path switching unit 44 is set in a posture (state indicated by a dashed line in FIG. 3) that guides the sheet to the second sheet discharge port side, and the second sheet discharge roller 47 (second conveying roller) is rotated in the counterclockwise direction in FIG. 3, to thereby allows the sheet to enter the branch path 34 from its rear end portion side.

Drive of the path switching unit 44 and conveying rollers (sheet discharge rollers) 46 and 47 is controlled based on detection signals from the respective sheet sensors Se1 and Se2. A controller 75 to be described later rotates the first sheet discharge roller 46 and the second sheet discharge roller 47 by a rotation amount previously set in accordance with a sheet size and stops the rollers 46 and 47. Then, the sheet conveyed from the carry-in port is fed to the buffer section Pb of the branch path 34 and temporarily stays therein.

Control Configuration

Figure 12:
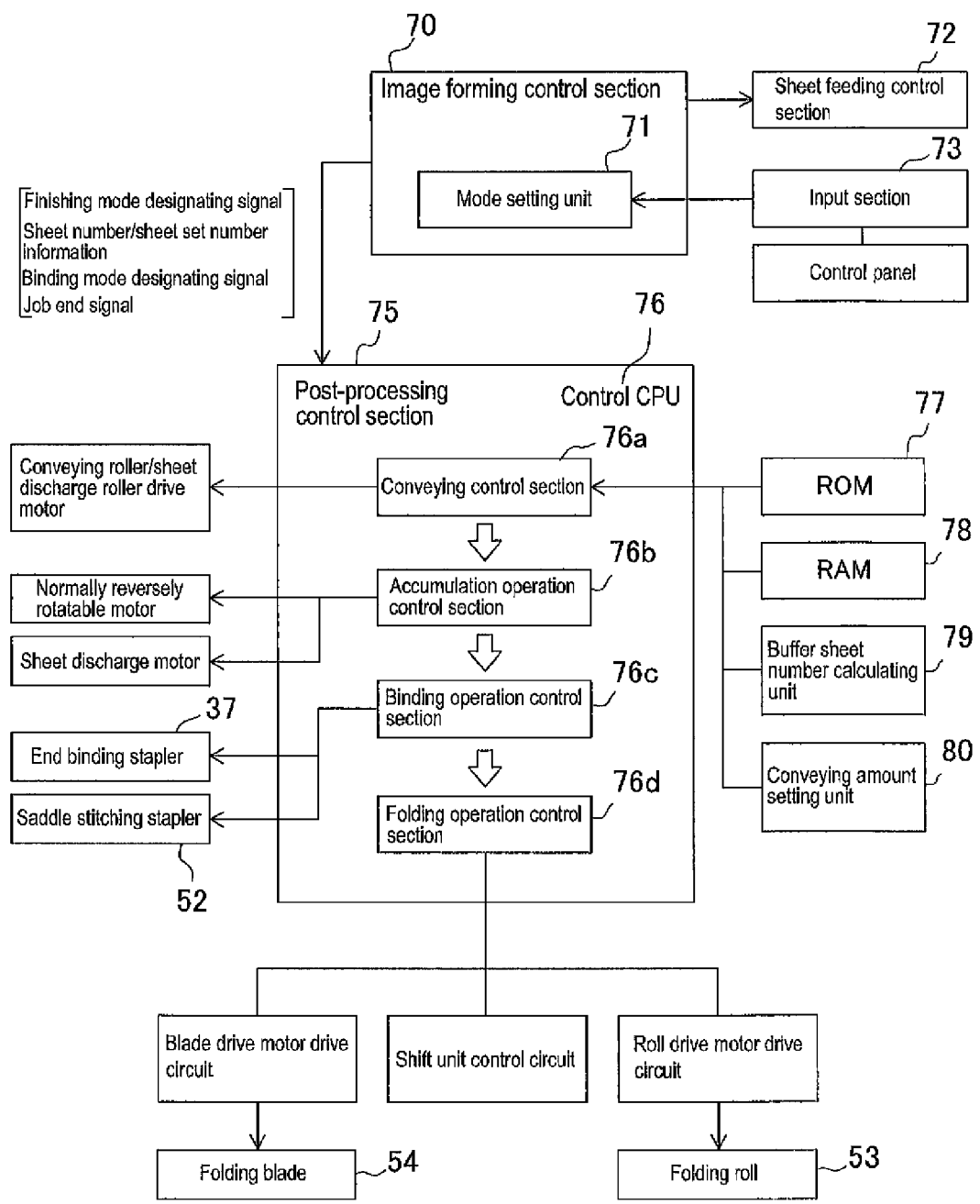
FIG. 12 is an explanatory view of a control configuration in the image forming system of FIG. 1.

The following describes a control configuration in the image forming system of FIG. 1. FIG. 12 is a block diagram of the control configuration. As illustrated in FIG. 12, the control configuration in the image forming system includes an image forming control section 70 and a post-processing control section 75. The image forming control section 70 includes a sheet feeding control section 72 and a mode setting unit 71. The mode setting unit 71 includes an input section 73 such as a control panel. The image forming control section 70 forms an image on a sheet under an image forming condition set in the mode setting unit 71. The sheet feeding control section 72 controls sheet feeding operation of feeding a sheet of a size set in the mode setting unit 71 from the sheet supply section 11 to image forming section 13. The mode setting unit 71 sets image forming conditions such as color/monochrome setting, enlarge/reduction ratio setting, and cover print setting. In addition, the mode setting unit 71 sets a mode of the post-processing performed for an image-formed sheet.

The post-processing device B can execute the first post-processing mode (end binding mode), second post-processing mode (bookbinding mode), and third post-processing mode (printout mode). In the first post-processing mode, image-formed sheets are accumulated and aligned on the processing tray 36 (first post-processing section), subjected to binding, and housed in the first housing stacker 41. In the second post-processing mode, image-formed sheets are accumulated and aligned on the accumulation guide 49a (second post-processing section), subjected to saddle stitching and folding, and housed in the second housing stacker 55. In the third post-processing mode, a sheet fed to the carry-in port 31 is not subjected to the post-processing but directly housed in the first housing stacker 41. The "end binding" refers to finishing that binds the accumulated and aligned sheet bundle at one or a plurality of positions along an end surface thereof, "saddle stitching" refers to finishing that binds the accumulated and aligned sheet bundle at a plurality positions around a center portion thereof.

The post-processing control section 75 includes a control CPU 76 that operates the post-processing device according to a specified post-processing mode (finishing), a ROM 77 that stores an operation program, and a RAM 78 that stores control data. The control CPU 76 includes a conveying control section 76a that controls conveyance of a sheet fed to the carry-in port 31, an accumulation operation control section 76b that controls sheet accumulation operation, a binding operation control section 76c that controls sheet bundle binding operation, and a folding operation control section 76d that controls sheet folding operation.

The above control sections 76a to 76d select and execute the operation mode (first post-processing mode) in which the post-processing is performed in the first post-processing section 35 or operation mode (second post-processing mode) in which the post-processing is performed in the second post-processing section 49.

The conveying control section 76a is connected to a control circuit (driver) of a drive motor (not illustrated) driving the carry-in roller 45 (intermediate roller 43) and first sheet discharge roller 46 of the conveying path 32 and receives detection signals from the respective sheet sensors Se1 and Se2 disposed along the conveying path 32. Further, the conveying control section 76a is connected to a control circuit (driver) of a drive motor (not illustrated) driving the second and third sheet discharge rollers 47 and 48 and receives a detection signal from a sheet sensor Se3 disposed in the branch path 34.

The conveying control section 76a executes control to make a sheet fed to the carry-in port 31 stand by in the buffer section Pb during execution of the post-processing operation (e.g., folding operation) in the first post-processing section 35 or the second post-processing section 49. To this end, the conveying control section 76a incorporates a buffer sheet number calculating unit 79 that calculates the number of sheets to be made to stand by during execution of the post-processing operation and a buffer sheet conveying amount setting unit 80 that conveys a buffer sheet (sheet to be made to stand by) at the carry-in port 31 to the buffer section Pb. Details of the buffer sheet number calculating unit 79 and buffer sheet conveying amount setting unit 80 will be described later.

The conveying rollers in each of the straight path 33 and the branch path 34 may be driven by a single drive motor or a plurality of independent drive motors. When the conveying rollers in each of the paths 33 and 34 may be driven by a single drive motor, drive of the motor is transmitted to the conveying rollers through a clutch unit. The accumulation operation control section 76b transmits a control signal to drive circuits of the normally reversely rotatable motor for the sheet carry-in unit 42 (lifting roller) and sheet discharge motor for the sheet carry-out unit 40 in order to accumulate sheets in the first post-processing section 35. Further, the binding operation control section 76c transmits a control signal to drive circuits of drive motors (not illustrated) incorporated respectively in the end binding stapler 37 of the first post-processing section 35 and the saddle stitching stapler 52 of the second post-processing section 49.

The folding operation control section 76d is connected to a drive circuit of a roll drive motor that drives the folding roll pair 53. Further, the folding operation control section 76d transmits a control signal to a control circuit of the second and third sheet discharge rollers 47 and 48 of the branch path 34 and a control circuit of the shift unit that controls movement of the leading end regulating unit 50 of the accumulation guide 49a to a predetermined position and receives a detection signal from sheet sensors (not illustrated) disposed in the respective conveying paths.

Buffer Sheet Number Calculating Unit

The following describes the buffer sheet number calculating unit 79. The calculating unit 79 is incorporated in the conveying control section 76a. The calculating unit 79 calculates the number of sheets to be made to stand by in the path from a conveying direction length (size information) of a sheet transmitted from the image forming device A and a post-processing time (e.g., sheet alignment time+binding time+folding time+processed sheet carry-out time) previously set and stored as data in the RAM 78. Assuming that the post-processing time is Td, image forming process time is Tp, and buffer sheet number is Bs, [Bs=Td/Tp] . . . (expression 1) is satisfied. Thus, the number of sheets to be made to stand by in the buffer section Pb during execution of the post-processing operation in the first post-processing section 35 or the second post-processing section 49 is set.

Buffer Sheet Conveying Amount Setting Unit

When the buffer sheets whose number has been calculated by the buffer sheet number calculating unit 79 are conveyed to the buffer section Pb and temporarily stopped (made to stand by), the conveying control section 76a controls the standby state of the buffer sheets such that the buffer sheets are overlapped while being offset front and rear in the path direction. This is in order to quickly and reliably (without jamming) convey the buffer sheets to the first post-processing section 35 or the second post-processing section 49 after completion of the post-processing operation.

In the illustrated device, a first buffer sheet n is conveyed to the buffer section Pb, and a second buffer sheet is offset (displaced) upstream by a previously set offset amount δ in the conveying direction. To realize this, the conveying control section 76a sets (varies), in accordance with the number of the buffer sheets, a conveying amount of the first and second sheet discharge rollers 46 and 47 based on a detection signal of the sheet discharge sensor Se2 that detects the leading end of the sheet.

For example, assuming that the conveying amount of the first buffer sheet is (Ln), the conveying amount of the second buffer sheet is set to (Ln−δ), and conveying amount of the third buffer sheet is set to (Ln−2×δ), and thereafter similarly, the conveying amount is gradually reduced. The reason that a plurality of sheets are displaced (offset) from each other in the conveying direction will be described later. It should be noted that the buffer sheets in the buffer section are not necessarily overlapped while being offset from each other in the present invention.

Post-Processing Operation

The thus configured post-processing control section 75 controls the post-processing device B to execute the following processing operations. As described above, the post-processing control section 75 can make the post-processing device B execute the first post-processing mode (end binding in the first post-processing section 35), second post-processing mode (bookbinding in the second post-processing 49), and third post-processing mode (printed sheet housing processing in the first post-processing section 35). Sheets fed from the image forming device A according to a mode set in the mode setting unit 71 are accumulated in the first post-processing section 35 or the second post-processing section 49, subjected to the post-processing, and housed in the downstream side stacker 41 or 55. The following describes "conveying order of sheets to be conveyed to post-processing section", "conveying operation of buffer sheets", "first post-processing operation", and "second post-processing operation" in this order.

Conveying Order of Sheets to be Conveyed to Post-Processing Section

As illustrated in FIG. 5, sheets fed from the carry-in port 31 are conveyed to the first post-processing section along the first switchback path 60 or to the second post-processing section 49 along the second switchback path 61. The sheets are fed to the carry-in port 31 in the image forming order of (n), (n+1), (n+2). The controller (control CPU) 76 conveys the sheets to the first post-processing section 35 through the straight path 33 or to the second post-processing section 49 through the branch path 34. During execution of the post-processing operation in the first post-processing section 35 or the second post-processing section 49, the sheets are made to temporarily stand by in the buffer section Pb.

In the first post-processing section 35, the sheets fed from the carry-in port 31 are stacked on the sheet placement surface 36a of the processing tray 36 in the order of (n), (n+1), (n+2) from below. Similarly, the sheets to be made to stand by in the buffer section Pb are stacked on the path in the order of (n), (n+1), (n+2) from below. Further, similarly, in the second post-processing section 49, the sheets are stacked in the order of (n), (n+1), (n+2) from below. In this state, the sheets in the first post-processing section 35 and those in the buffer section Pb have the same vertical posture, while the vertical posture of the sheets in the second post-processing section 49 differs from that of the sheets in the first post-processing section 35 and the buffer section Pb.

Conveying Operation of Buffer Sheets to Post-Processing Section

The plurality of sheets made to stand by in the buffer section Pb are collectively fed in a bundle for the first post-processing section 35 while fed one by one in the order that they are fed to the carry-in port 31 for the second post-processing section 49. The details will be described below with reference to FIG. 5. The sheets are fed to the carry-in port 31 in the image forming order of (n), (n+1), (n+2). These sheets are stacked in the buffer section Pb in the same order of (n), (n+1), and (n+2).

Upon completion of the post-processing operation of the post-processing section 35 (or 49), the controller 76 rotates the first and second sheet discharge (conveying) rollers 46 and 47 disposed along the buffer section Pb in the sheet conveying direction. At this time, the controller collectively conveys the buffer sheets stacked in a bundle for the first post-processing section 35; while conveys the buffer sheets stacked in a bundle one by one for the second post-processing section 49.

First Post-Processing Mode

Figure 11:
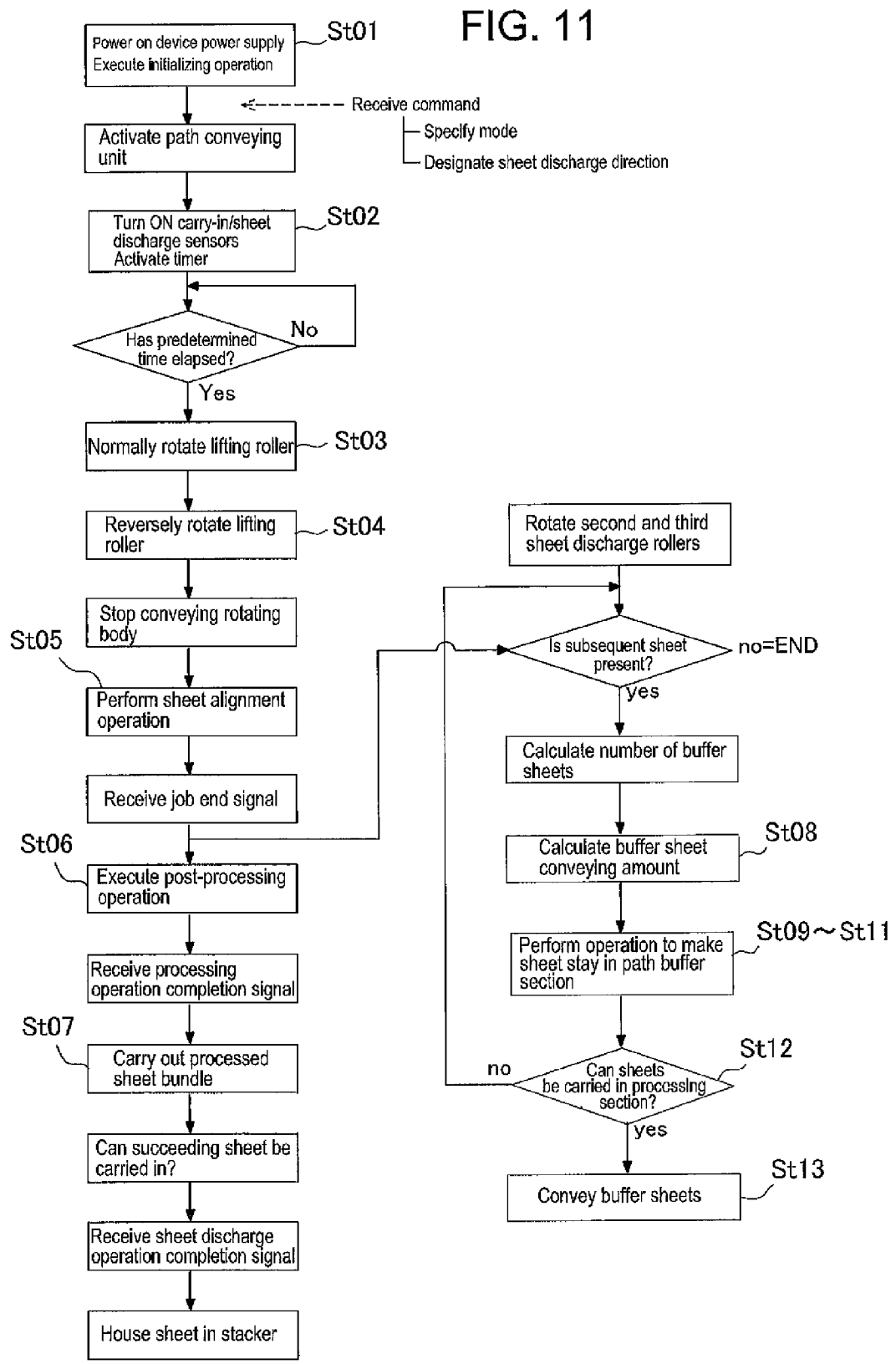
FIG. 11 is a flowchart illustrating a procedure of post-processing operation in the image forming system of FIG. 1.

The following describes an operation procedure of the first post-processing mode (end binding mode) according to a flowchart of FIG. 11. Upon power-on of a device power supply, the controller 76 executes initializing operation (descriptions of which will be omitted) (St01). The path switching unit 44 is positioned so as to allow a sheet to be conveyed in the sheet discharge direction along the straight path 33. The leading and rear ends of the sheet are detected by means of the sensors Se1 and Se2, respectively, and a timer is activated based on a detection signal from the sensor. Which one of the detection signals from the sensors Se1 and Se2 is used to determine (monitor) the sheet conveying state may be appropriately set.

At a timing at which the sheet leading end is carried out from the first sheet discharge port 33a, the lifting roller 42 (sheet carry-in unit) is moved down from the standby position to operating position at which it is engaged with the sheet. At the same time, the lifting roller 42 is rotated in the sheet discharge direction to convey the sheet in the sheet discharge direction (St03). At a timing at which the sheet rear end is carried out from the first sheet discharge port 33a, the lifting roller 42 is reversely rotated (i.e., rotated in the counter-sheet discharge direction) (St04).

Then, the conveying direction of the sheet is reversed (i.e., the sheet is switched back). Accordingly, the sheet is carried into the processing tray 36 disposed downstream of the first sheet discharge port 33a from the rear end side thereof and stopped by abutting against the sheet end regulating unit 38 on the tray (St05). Then, the controller positions the width direction of the sheet carried in the first post-processing section 35 to a reference position.

The controller 76 repeats the operation from step St02 to step St05 until it receives a job end signal from the image forming device A. With the above procedure, sheets on which an image has been formed in the image forming device A are accumulated and aligned in the first post-processing section 35. Upon reception of the job end signal from the image forming device A, the controller 76 controls the post-processing unit 37 (stapler) of the first post-processing section 35 to execute the post-processing operation (St06). Subsequently, upon reception of an operation completion signal from the post-processing unit 37, the controller 76 carries out the processed sheet bundle toward the downstream side first housing stacker 41 (St07).

Simultaneously with execution of the above post-processing operation, the controller 76 acquires, from the image forming device A, setting information (in this case, first post-processing mode) of the post-processing mode, a process speed of the image formation, and sheet size information and calls post-processing operation time data in the first post-processing section 35 stored in the RAM of the post-processing device B. Based on the above information, the controller 76 calculates the number of sheets to be made to stand by in the path by means of the buffer sheet number calculating unit 79 and calculates a conveying amount of the buffer sheets by means of the buffer sheet conveying amount setting unit 80 (St08).

When a succeeding sheet reaches the carry-in port 31, the controller 76 detects the succeeding sheet by means of the carry-in sensor Se1 and acquires, from a timer's time in the RAM 78, an estimated time for the sheet rear end to reach the branch portion 32a. After that, the controller 76 activates a timer in response to the detection signal from the carry-in sensor Se1.

Then, after timer-up, i.e., after elapse of the estimated time for the sheet rear end to pass through the branch portion 32a, the controller 76 changes the direction of the path switching unit 44 as indicated by the dashed line in FIG. 3 and, at the same time, rotates the first sheet discharge roller 46 and the second sheet discharge roller 47 in the counter-sheet discharge direction (St09). Then, the sheet enters the branch path 34 from the rear end side, and the controller 76 rotates the first and second sheet discharge rollers 46 and 47 by an amount set by the conveying amount setting unit 80 and then stops the rotation (St10).

Then, when the succeeding (second) sheet (n+1) reaches the carry-in port 31, the controller 76 carries the sheet (n+1) in the buffer section Pb in the same manner as above. A conveying amount of the sheet (n+1) is set to a value smaller than that of the preceding sheet (n) by the offset amount δ. Further, the succeeding (third), sheet (n+2) is carried in the buffer section Pb in the same manner with the conveying amount set to a value smaller than that of the preceding (second) sheet (n+1) by the offset amount δ (St11).

As described above, the sheets fed from the image forming device A during execution of the post-processing operation in the first post-processing section 35 are temporarily retained in a state of being bridged over the branch portion 32a between the straight path 33 and the branch path 34 (execution of St11). Then, the controller 76 receives a sheet carry-in permission signal from the first post-processing section 35 (St12). In response to the permission signal, the controller 76 rotates the first and second sheet discharge rollers 46 and 47 in the sheet discharge direction (clockwise direction in FIG. 3). Then, the buffer sheets are conveyed from the buffer section Pb to the first sheet discharge port 33a in an overlapped state (St13). The controller 76 rotates the lifting roller 42 and conveying rotating body 62, with the result that the sheet bundle abuts against the sheet end regulating unit 38 of the first post-processing section 35 of the post-processing device B and stopped.

Second Post-Processing Mode

The following describes the second post-processing mode (bookbinding mode). Upon power-on of a device power supply, the controller 76 executes initializing operation. When the sheet is fed to the carry-in port 31, the controller 76 detects the leading end thereof and activates a timer. Then, after timer-up, i.e., after elapse of the estimated time for the sheet rear end to pass through the branch portion 32a, the controller 76 changes the direction of the path switching unit 44 and rotates the first and second sheet discharge rollers 46 and 47 in the counter-sheet discharge direction to thereby guide the sheet from the straight path 33 to the branch path 34. The sheet is conveyed from the second sheet discharge port 34a to the second post-processing section 49 and accumulated on the accumulation guide 49a. Upon reception of the job end signal from the image forming device A, the controller 76 moves the sheets accumulated on the accumulation guide 49a to a binding position and performs binding by means of the binding unit.

Subsequently, the controller 76 moves the sheet bundle to a folding position, rotates the folding roll pair 53 in a folding direction, and moves the folding blade 54 from the standby position to operating position. Then, the sheet bundle is folded at its center. After execution of the folding operation, the folded sheet bundle is fed to and housed in the second housing stacker 55.

Simultaneously with execution of the above post-processing operation, the controller 76 calculates the number of sheets to be made to stand by means of the buffer sheet number calculating unit 79 and calculates the conveying amount of the buffer sheets by means of the buffer sheet conveying amount setting unit 80 same as in the first post-processing mode. When a succeeding sheet reaches the carry-in port 31, the controller 76 conveys the succeeding sheet to the buffer section Pb and makes it stand by therein as in the first post-processing mode.

As described above, the sheets fed from the image forming device A during execution of the post-processing operation (binding operation and folding operation) in the second post-processing section 49 are temporarily retained in a state of being bridged across the branch portion 32a between the straight path 33 and the branch path 34 (execution of St11). Then, the controller 76 receives a sheet carry-in permission signal from the second post-processing section 49. In response to the permission signal, the controller 76 rotates the third sheet discharge roller in the sheet discharge direction (counterclockwise direction in FIG. 3). Then, the buffer sheets (n, n+1, n+2) in an overlapped state are conveyed in a bundle from the second sheet discharge port 34a to the accumulation guide 49a.

At this time, in the second post-processing section 49, paging disorder occurs between the sheets (sheet group) made to stand by in the path and those (sheet group) not made to stand by. To cope with this problem, in the present invention, when a plurality of sheets are made to stand by in the path, the page order of images formed on the sheets to be made to stand by is made different from that of the images formed on the sheets that are not made to stand by. Details of this embodiment will be described later.

As described above, the sheets fed from the image forming device A during execution of the post-processing operation in the second post-processing section 49 are conveyed to the buffer section Pb disposed over the branch portion 32a between the straight path 33 and the branch path 34 and temporarily retained in a state of being bridged between the first and second sheet discharge rollers 46 and 47 arranged at a predetermined interval. Then, when a state is reached in which the sheets can be carried in the second post-processing section 49, the controller 76 conveys collectively the plurality of sheets made to be stand by in the buffer section from the second sheet discharge port 34a to the accumulation guide 49a. After carrying in the buffer sheets in the accumulation guide, a succeeding sheet fed to the carry-in port is accumulated on the buffer sheets.

Operation State of Buffer Sheet Conveyance

<First Post-Processing Mode>

Figure 7A:
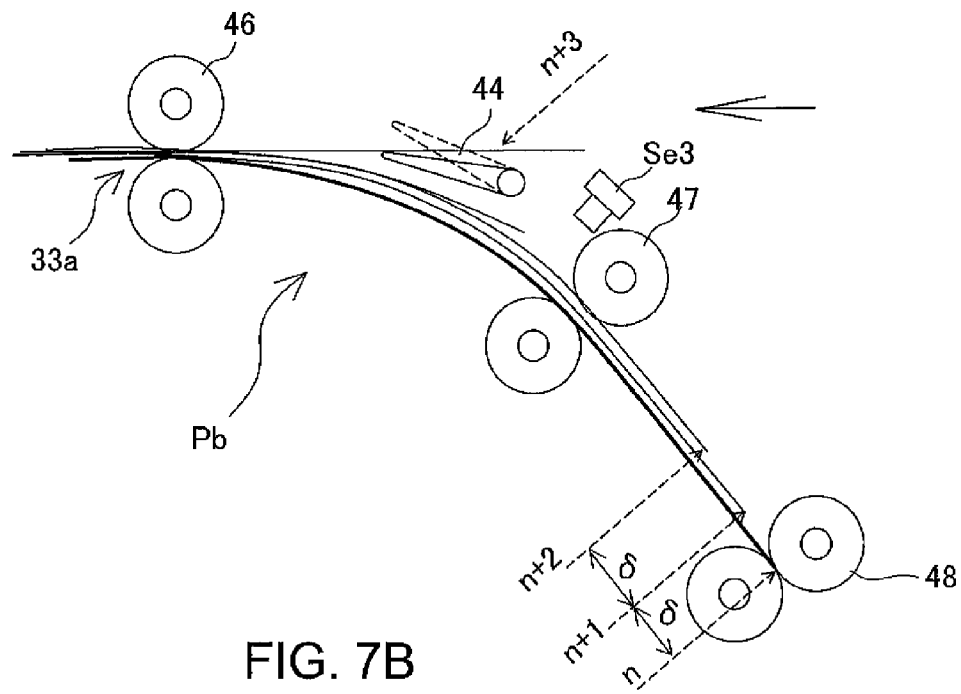
Figure 7B:
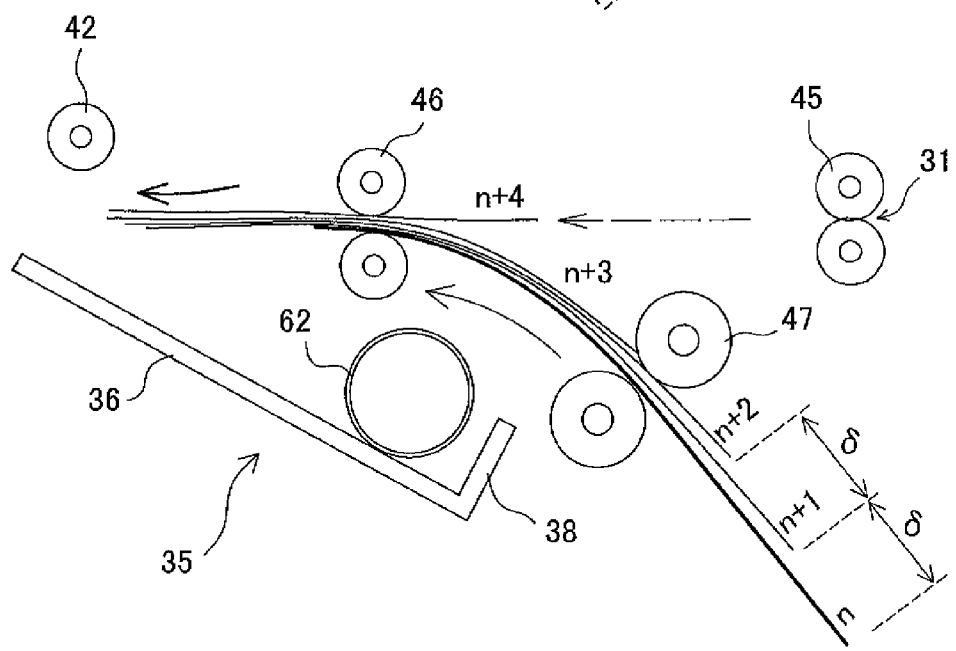

The following describes a buffer sheet conveying state in the first post-processing mode with reference to FIGS. 7A and 7B. FIG. 7A illustrates a state where a plurality of sheets are conveyed to the buffer section Pb and made to temporarily stand by. The sheets fed to the buffer section Pb from the carry-in port 31 are retained by the first and second sheet discharge rollers 46 and 47 in a state of being overlapped in the order of the first sheet (n), second sheet (n+1), and third sheet (n+2) from below. More specifically, the plurality of sheets are overlapped in a scale shape with the offset amount δ in the feeding order (in the order that they are fed to the carry-in port 31).

When carrying the buffer sheets in the first post-processing section 35, the controller 76 rotates the first and second sheet discharge rollers 46 and 47 in a stopped state in a direction (clockwise direction in FIG. 7A) guiding the buffer sheets to the first sheet discharge port 33a as illustrated in FIG. 7A. Then, the plurality of overlapped sheets are fed from the first sheet discharge port 33a to the first post-processing section (processing tray) 35 and made to abut against the sheet end regulating unit 38 illustrated in FIG. 7B by the normal/reverse rotation of the lifting roller 42.

Figure 8A:
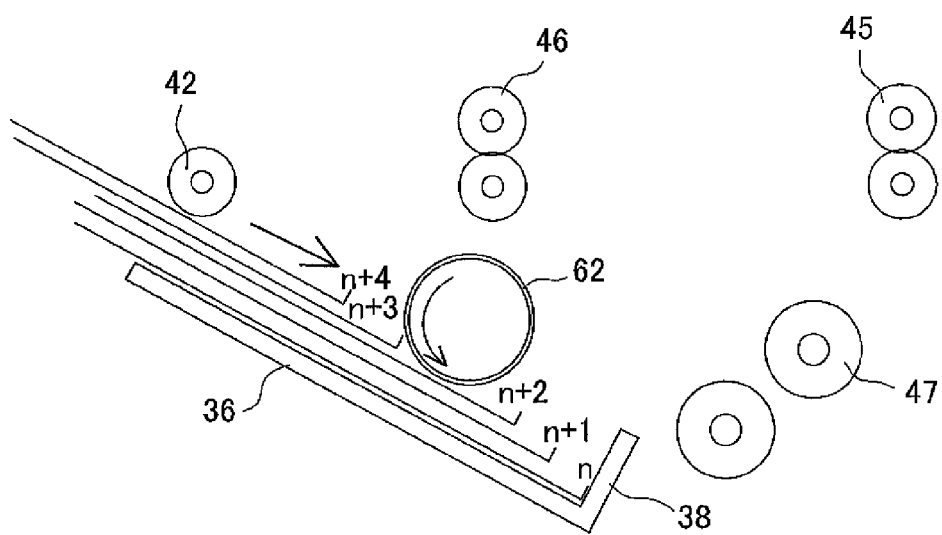
Figure 8B:
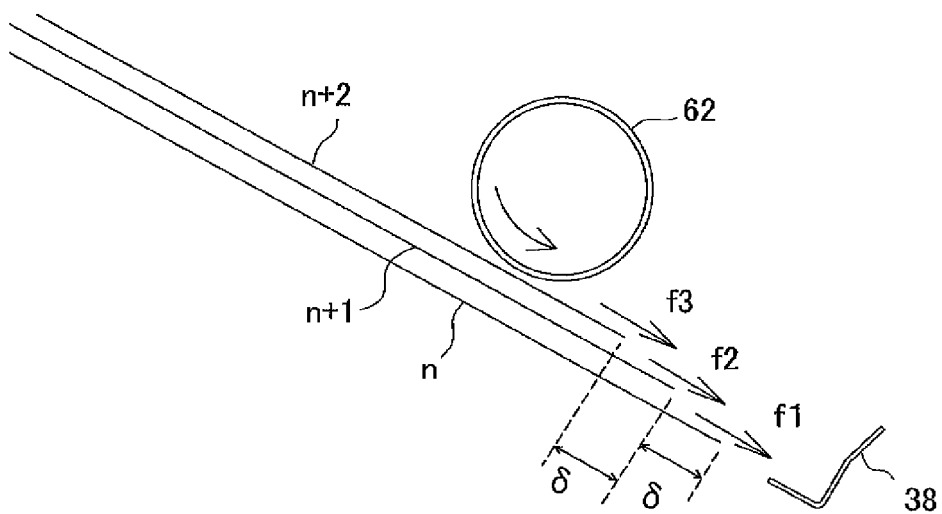

At this time, conveying forces (f1, f2, and f3) are applied from the conveying rotating body 62 to the plurality of sheets, respectively. As illustrated in FIG. 8B, the conveying force f3 acting on the topmost sheet (n+2) engaged with the conveying rotating body 62 is largest, followed by the conveying force f2 acting on the sheet (n+1) under the sheet (n+2) and conveying force f1 acting on the sheet (n) under the sheet (n+1). In this state, the sheets are displaced from each other by the offset amount δ in an approaching/separating direction toward the sheet end regulating unit 38.

Thus, among the sheets displaced from each other by the offset amount δ, the lowermost sheet is closest to the stopper (sheet end regulating unit 38), and the topmost sheet is farthest to the stopper. On the contrary, the conveying forces f are applied to the sheets such that the largest conveying force is applied to the topmost sheet.

<Second Post-Processing Mode>

Figure 9A:
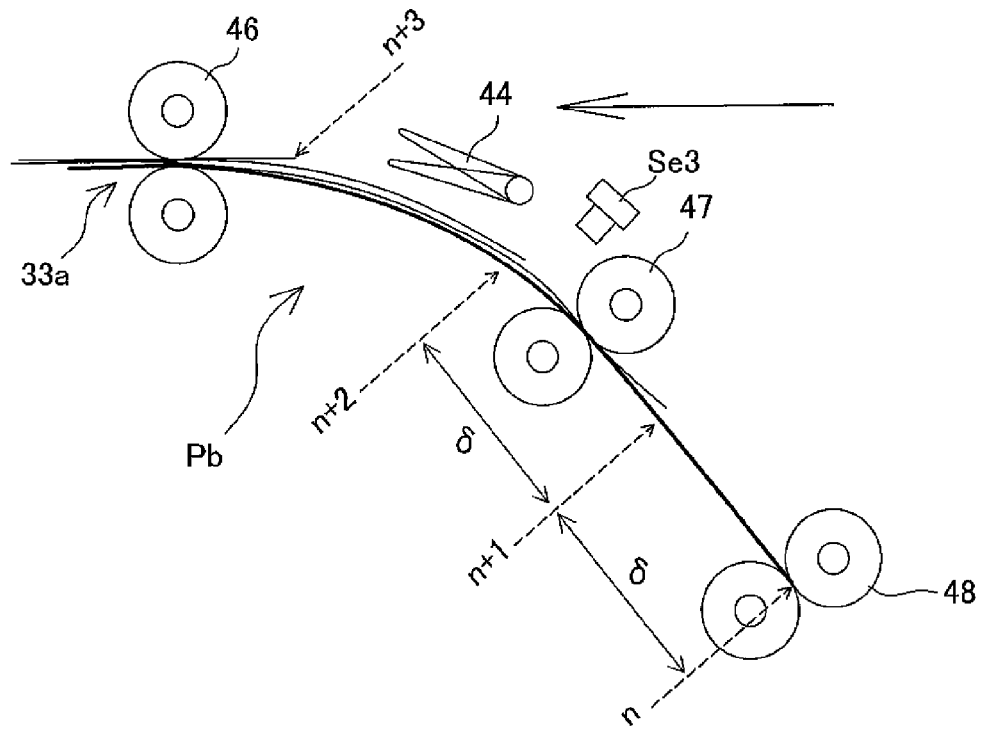
Figure 9B:
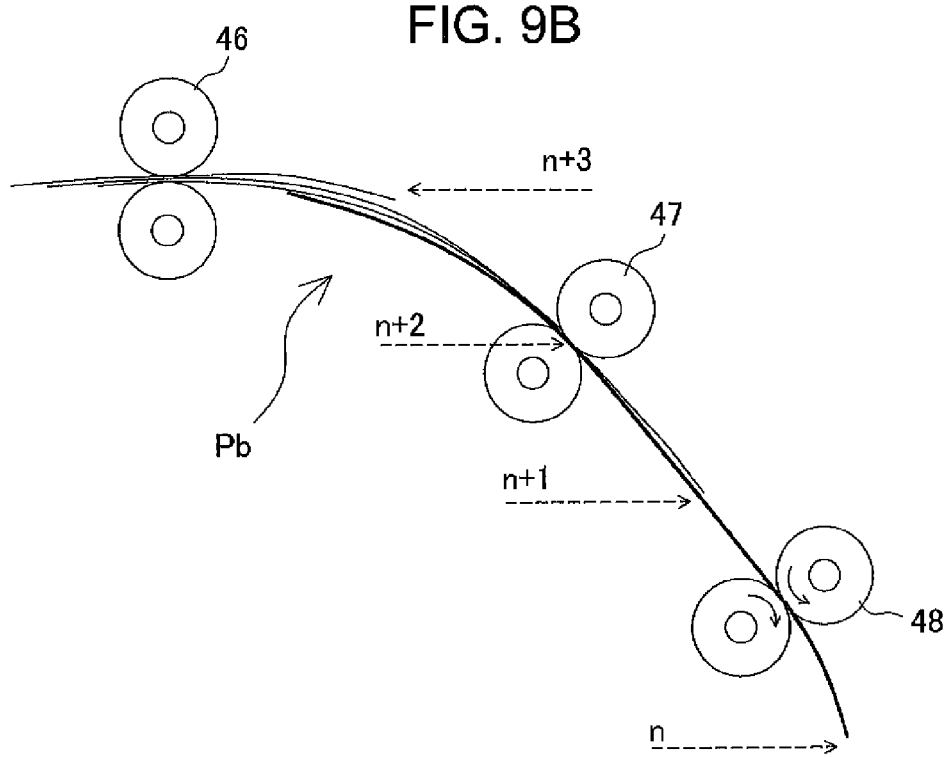
Figure 10:
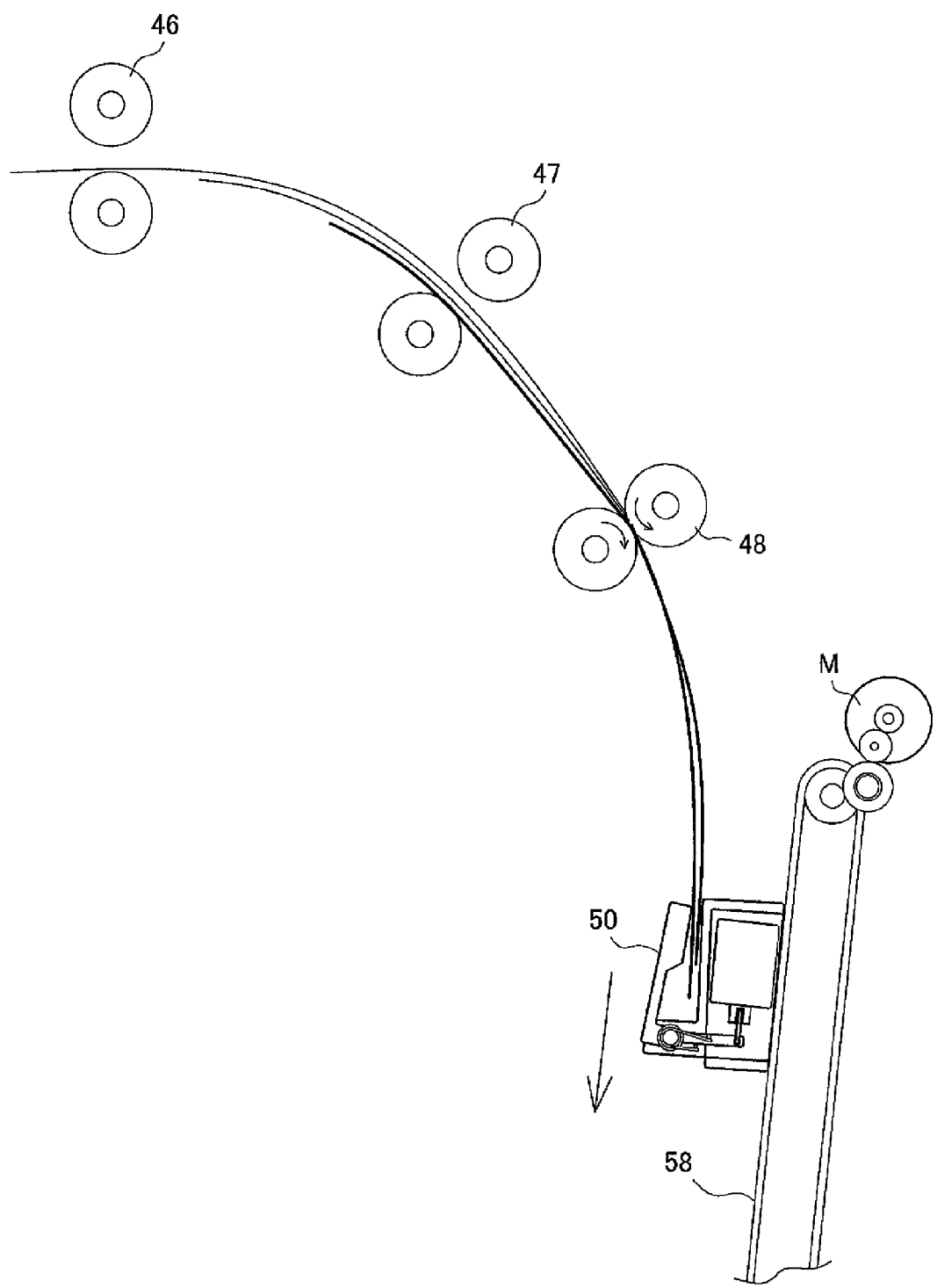
FIG. 10 is an explanatory view illustrating an operation state where the buffer sheets are conveyed to the second post-processing section, in which a first sheet is being carried in the second post-processing section from the buffer section.

The following describes a buffer sheet conveying state in the second post-processing mode with reference to FIGS. 9A and 9B and FIG. 10. FIG. 9A illustrates a state where a plurality of sheets are conveyed to the buffer section Pb and made to temporarily stand by. The sheets fed to the buffer section Pb from the carry-in port 31 are retained by the first and second sheet discharge rollers 46 and 47 in a state of being overlapped in the order of the first sheet (n), second sheet (n+1), and third sheet (n+2) from below. More specifically, the plurality of sheets are overlapped in a scale shape with the offset amount δ in the feeding order (in the order that they are fed to the carry-in port 31). The offset amount δ in this case may be the same as or different from the offset amount δ set in the first post-processing mode.

When a state is reached in which the sheets can be carried in the second post-processing section 49 (when the post-processing operation in the second post-processing section is completed), the controller 76 conveys the sheets made to be stand by in the buffer section. Pb to the accumulation guide 49a. At this time, when a plurality of sheets are made to stand by in an overlapped manner in the buffer section, the controller 76 conveys collectively the plurality of sheets from the second sheet discharge port 34a to the accumulation guide 49a. Specifically, the controller 76 rotates the third sheet discharge roller 48 in the counterclockwise direction in FIG. 3. In this case, the first sheet discharge roller 46 is stopped in a separated state from the sheets, and the second sheet discharge rollers 47 are rotated in the same direction as the roller 48.

Subsequently, the controller 76 puts each of the first and second sheet discharge rollers 46 and 47 in a state of being separated from the sheets (in a standby posture). Then, as illustrated in FIG. 10, the sheets are nipped by the third sheet discharge roller 48 and fed to the accumulation guide 49a by rotation thereof.

In the present invention, a succeeding sheet is made to stand by in the middle of the path during execution of the post-processing operation in the post-processing section. When a plurality of succeeding sheets are made to stand by in the middle of the path, an image forming order (page order) of the sheets to be made to stand by is made different from that of the sheets that are not made to stand by. Specifically, assume that the sheets that are not made to stand by are subjected to image formation in the order of (n, n+2, In this case, the sheets to be made to stand by are subjected to image formation in the order of n+2, n+1, n), made to stand by in this order, conveyed in a bundle in this order, and stacked on the sheets that are not made to stand by in the second post-processing section 49.

The above-described configuration can take the following embodiments: an embodiment (first embodiment) in which the image forming device A is provided with "standby sheet number calculating unit 81 and image forming order setting unit 82"; an embodiment (second embodiment) in which the post-processing device B is provided with "standby sheet number calculating unit 81 and controller that accumulates sheets on which an image has been formed in the order set based on a result of the calculation after making the image-formed sheets temporarily stand by"; and an embodiment (third embodiment) in which an image forming system is provided with "standby sheet number calculating unit, image forming order setting unit 82, and image formation/post-processing operation instructing unit". The following describes the above first to third embodiments.

First Embodiment

Figure 13:
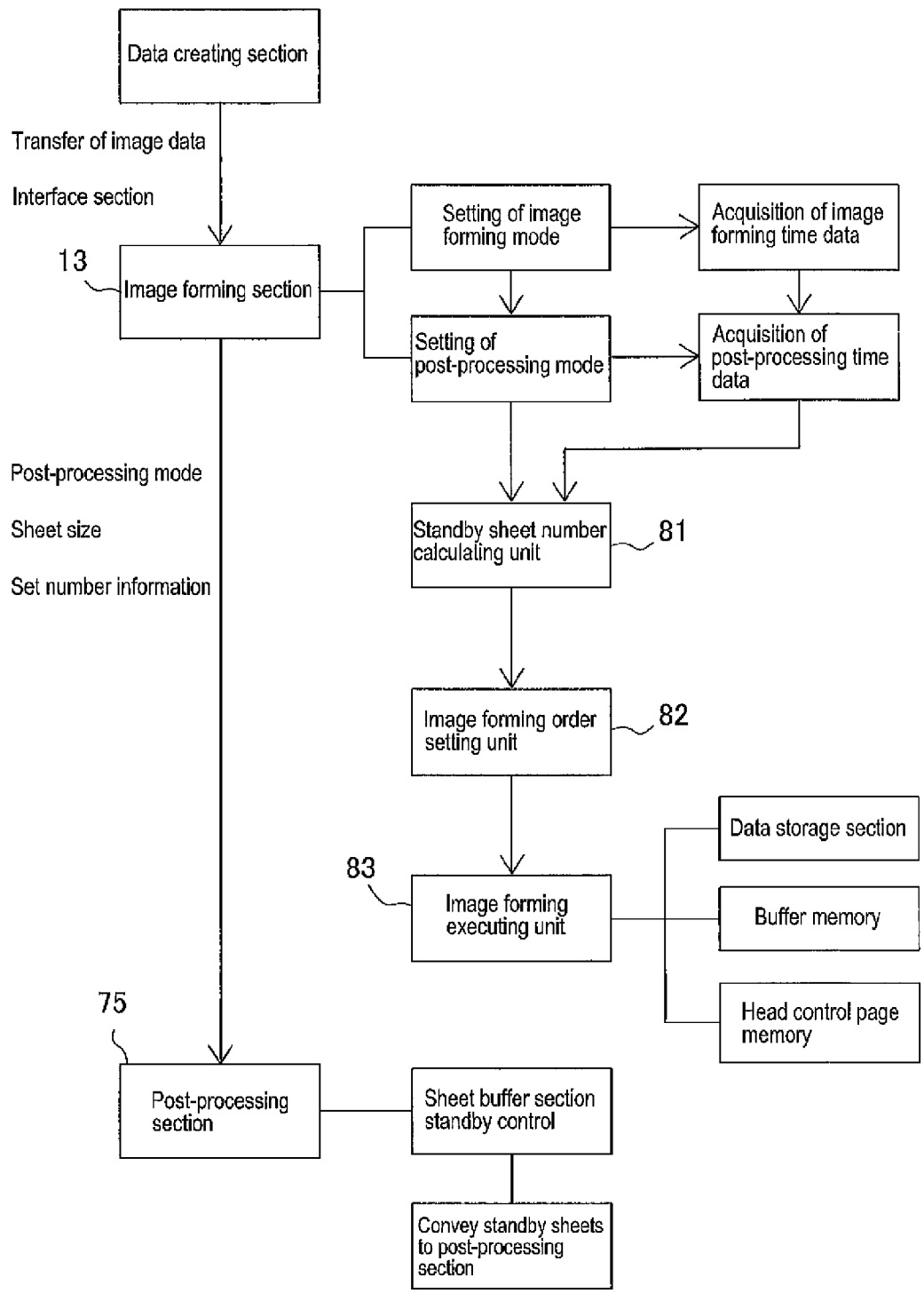
FIG. 13 is a control configuration diagram of a first embodiment in the present invention.

In an embodiment illustrated in FIG. 13, "standby sheet number calculating unit 81" and "image forming order setting unit 82" are provided in the control section 70 of the image forming device A (they are incorporated in a CPU in the illustrated example). A CPU constituting the control section 70 in the above-described control configuration (see FIG. 12) acquires a time required for image formation and the number of pages from the process speed and sheet size according to setting condition of an image forming mode. The process speed is previously stored in, e.g., the RAM and read out therefrom.

Further, the CPU acquires post-processing time data from the setting of the post-processing mode (in the illustrated example, one of the first to third post-processing modes is selected). The post-processing time data is previously stored in the RAM of the control section or RAM 78 of the control section 75 and read out therefrom.

The control section 70 incorporates in the CPU a standby sheet number calculating unit 81. The standby sheet number calculating unit 81 simply calculates the number of standby sheets according to an expression: [post-processing time/image forming time]. That is, the number of sheets on which an image is formed by the upstream side image forming device A until the time required to complete the post-processing elapses is calculated. A unit (image forming order setting unit 82) that sets an image forming order according to the calculated number of sheets (with a slight allowance) is incorporated in the CPU. The image forming order setting unit 82 makes the image forming order different between the sheets to be made to stand by in the path of the post-processing device B and those that are not made to stand by. That is, assuming that the image forming order of the non-standby sheets is set as (n, n+1, n+2, . . . ), the image forming order of the standby sheet is set in a reverse order ( . . . , n+2, n+1, n).

An image forming executing unit 83 forms an image on the sheet in the order set by the image forming order setting unit 82 and feeds the image-formed sheets to the post-processing device B through the sheet discharge port 21. The controller 76 of the post-processing device B makes a sheet fed to the carry-in port 31 temporarily stay in the buffer section Pb during execution of the post-processing operation (for example, while receiving an operating signal from the post-processing unit (stapler 37 (52), folding roll 53, etc.)). After that, the controller 76 conveys the standby sheets in a bundle to the post-processing section after completion of the post-processing operation according to the operation flow described above.

That is, in this embodiment, the sheets on which an image has been formed by the image forming device A are made to stand by at the upstream side of the post-processing section 35 or 49 during execution of the post-processing operation in the post-processing section 35 or 49 of the post-processing device B. The CPU (standby sheet number calculating unit 81) calculates the number of sheets to be made to stand by from the mode setting condition of the image forming device A. Then, the image forming order (page order) of the standby sheets is set to an order different from that of the sheets that are not made to stand by. Then, the sheets are subjected to image formation in the set order and fed to the post-processing device B.

Operation of First Embodiment

Figure 14:
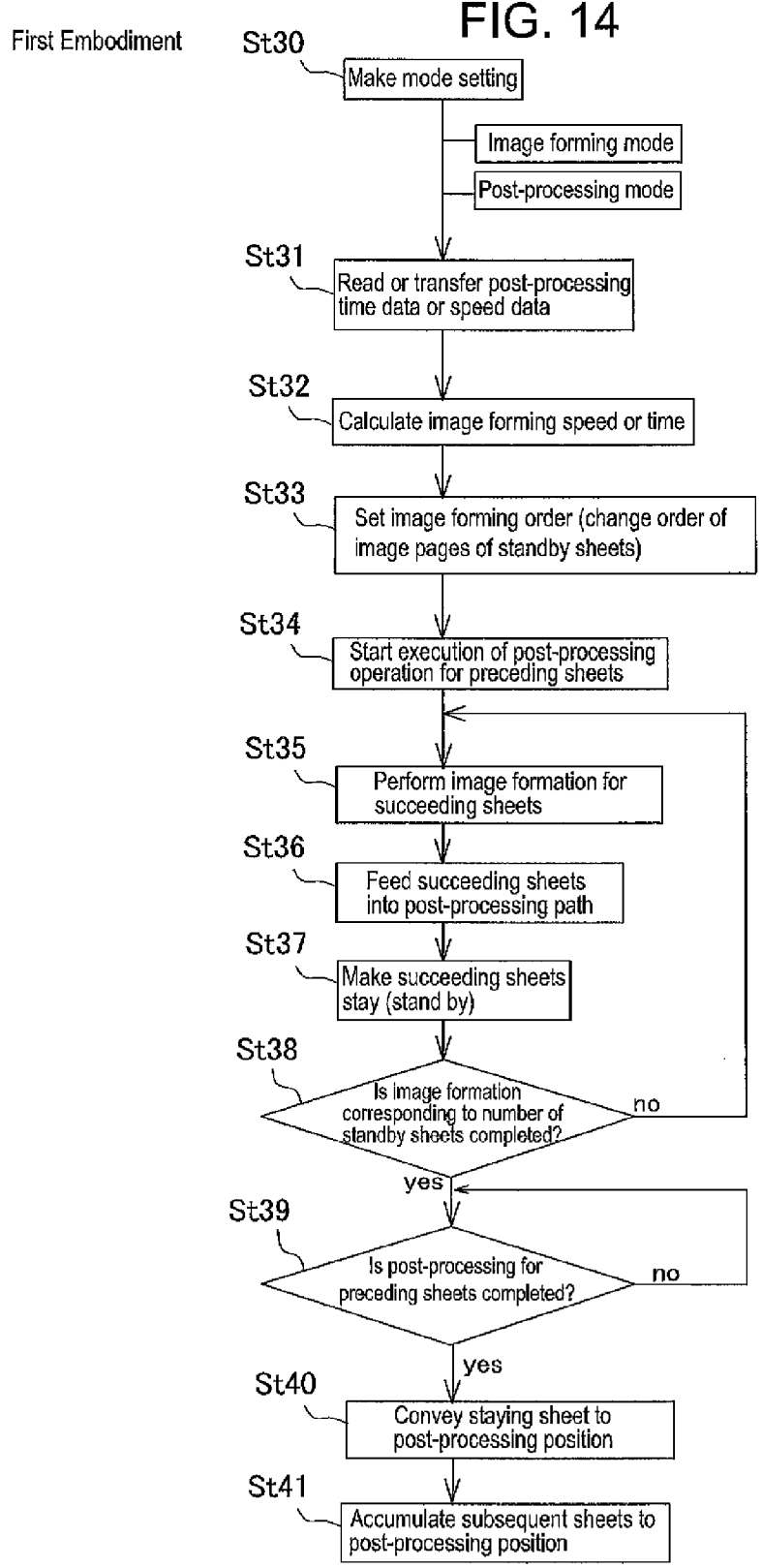
FIG. 14 is a view of an operation flow in the embodiment of FIG. 13.

The following describes an operation flow in the first embodiment according to a flowchart of FIG. 14. The image forming mode and post-processing mode are set by means of the mode setting unit 71 disposed in the control section 70 of the image forming device A (St30). Specifically, an operator performs input relating to the mode setting through the input unit 73 such as a control panel. The control section 70 acquires the image forming time data from the setting condition of the image forming mode. As the image forming time data, a process speed is previously stored in a RAM 84 and read out therefrom (St31).

The control section 70 acquires an operation time required for the post-processing according to the post-processing mode set by the operator (St32). The time data is previously stored in the RAM 78 of the post-processing device or RAM 84 of the control section 70.

Then, the control section 70 sets an order of image formation on sheets (i.e., page order) by means of the image forming order setting unit 82 provided in the CPU (St33), and the post-processing operation (in the illustrated example, binding and folding) is performed for preceding sheets accumulated in the second post-processing section 49. The start timing of the post-processing operation is set based on an image forming job end signal of the preceding sheets. As a result, the binding and folding operations progress in the second post-processing section 49 (St34).

The control section 70 forms an image on sheets succeeding to the preceding sheets being subjected to the post-processing by means of the image forming section 13 during continuation of the post-processing operation in the post-processing section 49 (St35). The succeeding sheets are fed from the image forming device A to the post-processing device B (St36) and made to temporarily stand by in the buffer section Pb of the post-processing device B (St37). Then, the control section 70 determines whether or not image formation corresponding to the number of the standby sheets calculated by the standby sheet number calculating unit 81 has been executed (St38). When determining that image formation for a predetermined number of sheets has been completed, the control section 70 issues a standby sheet image forming end signal. Upon reception of the standby sheet image forming end signal, the post-processing control section 75 conveys the plurality of sheets staying in the buffer section Pb in an overlapped state to the downstream side post-processing section 49 (St39).

After the standby sheets are subjected to image formation, standby in the buffer section, and bundle conveyance to the post-processing section 49, the image forming device A performs image forming operation for next succeeding sheets, and the post-processing device B accumulates the succeeding sheets in the post-processing section (second post-processing section) 49 without making them stand by in the buffer section Pb (St41).

In the process of the above-described operation, the image forming order is made different between the sheets to be made to stand by in the buffer section Pb and those that are not made to stand by, as described above.

Second Embodiment

Figure 15:
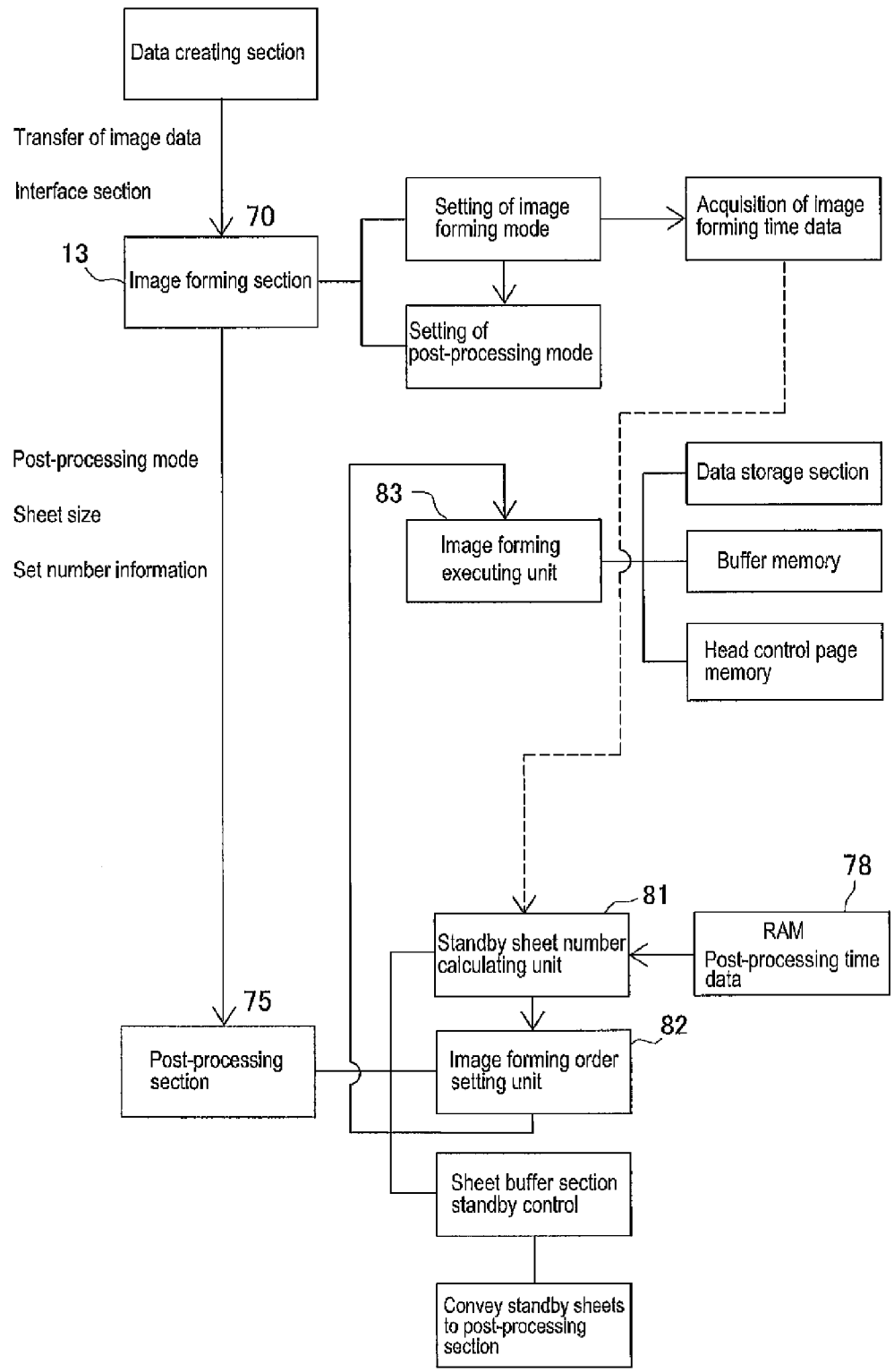
FIG. 15 is a control configuration diagram of a second embodiment in the present invention.

The following describes the second embodiment with reference to FIG. 15. In an embodiment illustrated in FIG. 15, "standby sheet number calculating unit 81" and "image forming order setting unit 82" are provided in the control section 75 of the post-processing device B. A CPU constituting the control section 75 in the above-described control configuration (see FIG. 12) acquires (calculates) a time (per page) required for image formation from the process speed and sheet size according to setting condition of the image forming mode.

The process speed information and sheet size information are acquired by data transfer from the image forming device A. The post-processing control section 75 calculates a time required for the post-processing operation according to the post-processing mode set in the image forming device A. The time required for the post-processing operation is previously stored in the RAM 78. Other configurations are the same as those in the first embodiment, so descriptions thereof will be omitted.

Operation of Second Embodiment

Figure 16:
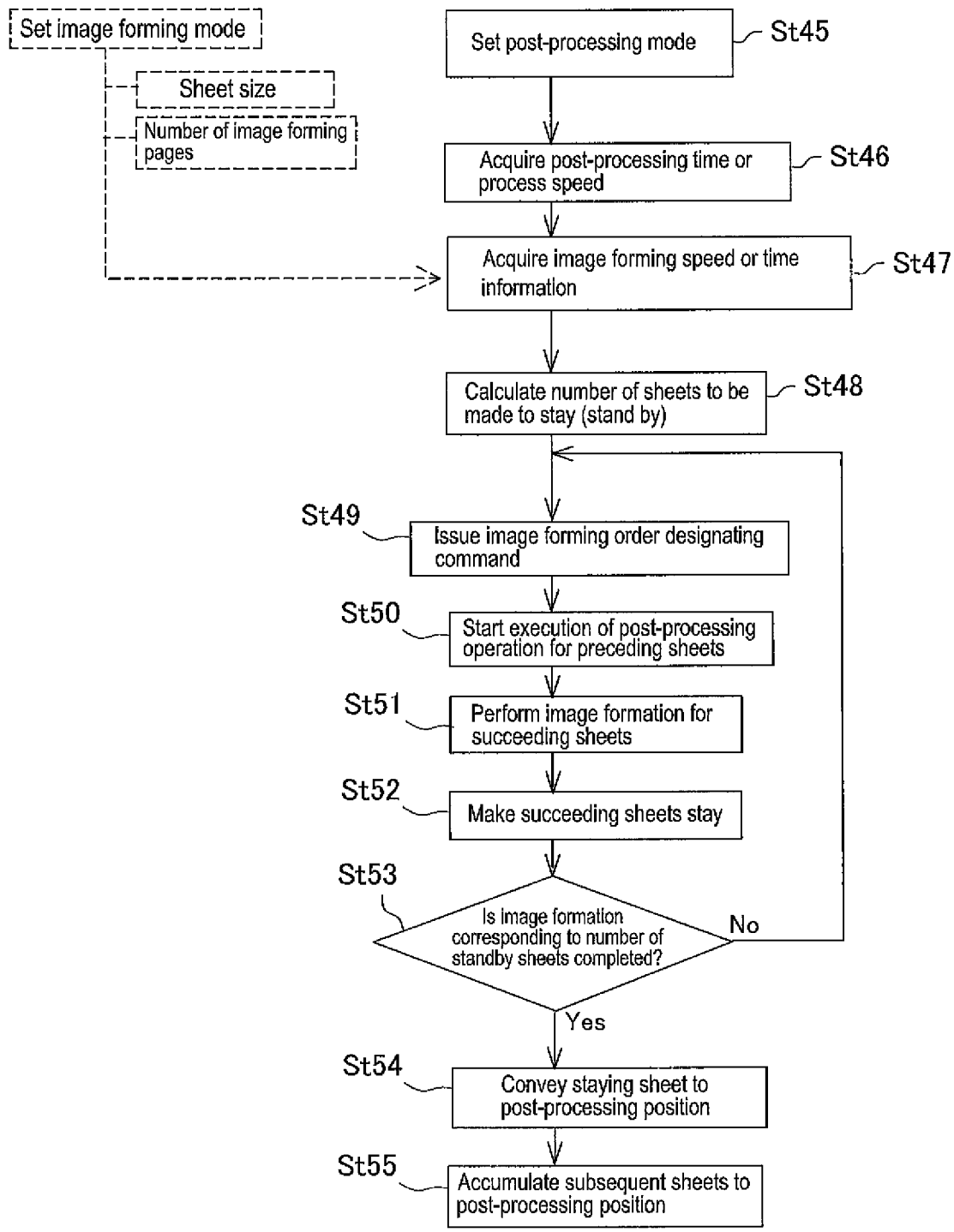
FIG. 16 is a view of an operation flow in the embodiment of FIG. 15.

The following describes an operation flow in the second embodiment according to a flowchart of FIG. 16. The image forming mode and post-processing mode are set by means of the mode setting unit 71 disposed in the control section 70 of the image forming device A (St45). Specifically, an operator performs input relating to the mode setting through the input unit 73 such as a control panel. The controller 76 acquires the image forming time data from the setting condition of the image forming mode. As the image forming time data, a process speed is previously stored in the RAM 84 and read out therefrom (St46).

The controller 76 acquires an operation time required for the post-processing according to the post-processing mode set by the operator (St47). The time data is previously stored in the RAM 78 of the post-processing device or RAM 84 of the control section 70.

Then, the controller 76 sets an order of image formation on sheets (i.e., page order) by means of the image forming order setting unit 82 provided in the CPU (St48) and then executes the post-processing operation (in the illustrated example, binding and folding) for preceding sheets accumulated in the second post-processing section 49. The start timing of the post-processing operation is set based on an image forming job end signal of the preceding sheets (St49). As a result, the binding and folding operations progress in the second post-processing section 49 (St50).

The controller 76 forms an image on sheets succeeding to the preceding sheets being subjected to the post-processing by means of the image forming section 13 during continuation of the post-processing operation in the post-processing section 49 (St51). The succeeding sheets are fed from the image forming device A to the post-processing device B and made to temporarily stand by in the buffer section Pb of the post-processing device B (St52). Then, the controller 76 determines whether or not image formation corresponding to the number of the standby sheets calculated by the standby sheet number calculating unit 81 has been executed (St53). When determining that image formation for a predetermined number of sheets has been completed, the controller 76 issues a standby sheet image forming end signal. Upon reception of the standby sheet image forming end signal, the post-processing control section 75 conveys the plurality of sheets staying in the buffer section Pb in an overlapped state to the downstream side post-processing section 49 (St54, St55).

Third Embodiment

Figure 17:
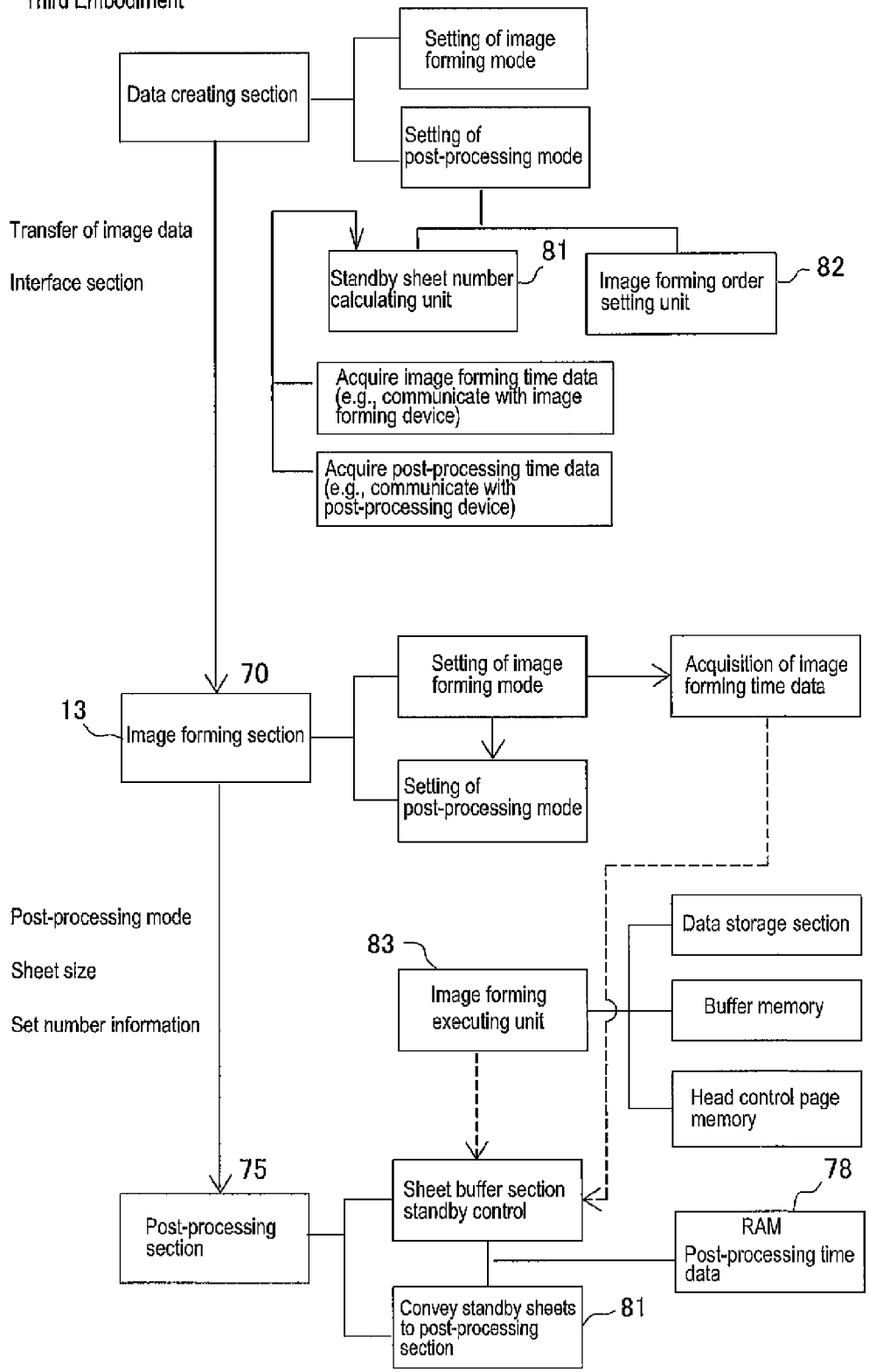
FIG. 17 is a control configuration diagram of a third embodiment in the present invention.

The present invention is featured in that succeeding image-formed sheets are made to temporarily stand by at the upstream side of the post-processing section during execution of the post-processing operation for the preceding sheets and conveyed to the post-processing section after completion of the post-processing operation for the preceding sheets. As an embodiment different from the first and second embodiments, the image forming system is constituted by a data creating section (personal computer, etc.), an image forming section (printer, etc.), and a post-processing section (finisher, etc.) (see FIG. 17).

The standby sheet number calculating unit 81 and the image forming order setting unit 82 are disposed in the data creating section (application software or driver software of the computer). The configurations of the standby sheet number calculating unit 81 and image forming order setting unit 82 are the same as those in the first and second embodiments.

What is claimed is:

1. An image forming system comprising:
an image forming section that forms an image on sheets;
a processing section that performs processing for image-formed sheets, the processing section including a first processing section for binding the image-formed sheets and a second processing section for folding the image-formed sheets;
a conveying path for consecutively conveying the sheets from the image forming section to the first processing section, or for conveying the sheets from the image forming section, reversing front and back surfaces of the sheets, and conveying the sheets to the second processing section;
a standby section disposed in the conveying path, in which the sheets to be fed to the processing section are made to temporarily stand by; and
a control section that controls the image forming section and the processing section, wherein the control section includes:
a calculating unit that calculates a number of sheets to be made to stand by in the standby section during execution of the processing in the processing section; and
an image order setting unit that sets an image forming order of sheets to be made to standby based on the number of sheets calculated by the calculating unit,
wherein the image order setting unit is structured so that when the sheets stand by at the standby section, the image forming order of the sheets conveyed to the second processing section is made different from that of the sheets conveyed to the first processing section.

2. The image forming system according to claim 1, wherein when the sheets made to stand by in the standby section are conveyed to the processing section in an overlapped state, the sheets are stacked in the processing section in an order corresponding to the image forming order set by the image order setting unit.

3. The image forming system according to claim 1, wherein the conveying path comprises:
a straight path extending from the image forming section toward the first processing section, for conveying the sheets toward the first processing section, the straight path including a first sheet discharge roller at a downstream end thereof, and
a branch path branching from the straight path in a direction away from the straight path, for conveying the sheets toward the second processing section, the branch path including a second sheet discharge roller spaced from the first sheet discharge roller at a distance less than a length of the sheets, and
the conveying path has the standby section between the first sheet discharge roller of the straight path and the second sheet discharge roller of the branch path, in which the sheets are accumulated and retained between the first sheet discharge roller and the second sheet discharge roller to temporarily stand by.

4. The image forming system according to claim 3, wherein the control section controls so that the sheets at the standby section are collectively fed in a bundle to the first post-processing section and fed to the second post-processing section in a state in which a subsequent sheet of the sheets partially overlaps a preceding sheet of the sheets.

5. The image forming system according to claim 4, wherein the calculating unit calculates the number of sheet to be made to stand by from a length of the sheet and a predetermined post-processing time.

6. A processing device comprising:
a processing section that performs processing for sheets, the processing section including a first processing section for binding image-formed sheets and a second processing section for folding the image-formed sheets;
a conveying path for conveying the sheets from an image forming device to the processing section;
a standby section disposed in the conveying path, in which the sheets to be fed to the processing section are made to temporarily stand by in the standby section;
a calculating unit that calculates a number of sheets to be made to stand by during execution of a set processing mode; and
an image order setting unit that sets an image forming order of sheets to be made to standby in which the number of sheets to be made to standby has been calculated by the calculating unit,
the image order setting unit is structured so that when the sheets stand by at the standby section, the image forming order of the sheets conveyed to the second processing section is made different from that of the sheets conveyed to the first processing section.

7. The processing device according to claim 6, wherein the conveying path is branched to guide conveyed sheets to the first processing section or the second processing section, and
the standby section is disposed such that the sheets are made to stand by at a downstream side of the branch portion in a state of being bridged between a first processing side and a second processing side.

8. The processing device according to claim 7, wherein in the conveying path, the sheets fed from a carry-in port are stacked upward in a feeding order in the standby section,
the sheets are conveyed from the standby section to the first processing section without reversing, and the sheets are reversed and conveyed from the standby section to the second processing section.

9. The processing device according to claim 8, wherein the first processing section is disposed at a path discharge port of the conveying path, the second processing section is disposed at a branch path discharge port of a path branched from the conveying path, a folding roll pair that folds accumulated sheets is disposed in the second processing section, and the second processing section is disposed below the first processing section, and the folding roll pair carries out folded sheets in the direction as a sheet discharge direction of the conveying path.

10. The processing device according to claim 9, wherein the first processing section includes:

a sheet placement tray on which the sheets fed from the carry-in port are accumulated temporarily;

a binding unit that is disposed in the sheet placement tray and binds a bundle of accumulated sheets; and a stacker unit that houses a bound bundle of the accumulated sheets, and the second processing section includes:

a sheet placement tray on which the sheets fed from the carry-in port are accumulated temporarily;

a folding unit that is disposed in the sheet placement tray and folds a bundle of the accumulated sheets; and a stacker unit that houses a folded bundle of the accumulated sheets.

* * * * *